(12) United States Patent
Chikami

(10) Patent No.: US 9,519,358 B2
(45) Date of Patent: Dec. 13, 2016

(54) PEN-SHAPED COORDINATE INDICATOR

(71) Applicant: Wacom Co., Ltd., Saitama (JP)

(72) Inventor: Toshihide Chikami, Saitama (JP)

(73) Assignee: Wacom Co., Ltd., Saitama (JP)

( * ) Notice: Subject to any disclaimer, the term of this patent is extended or adjusted under 35 U.S.C. 154(b) by 659 days.

(21) Appl. No.: 13/895,154

(22) Filed: May 15, 2013

(65) Prior Publication Data

US 2013/0321353 A1    Dec. 5, 2013

(30) Foreign Application Priority Data

May 31, 2012   (JP) .................................. 2012-124021

(51) Int. Cl.
   *G06F 3/045*       (2006.01)
   *G06F 3/0354*      (2013.01)
(52) U.S. Cl.
   CPC ................. *G06F 3/03545* (2013.01)
(58) Field of Classification Search
   CPC ........................................................ G09G 4/00
   See application file for complete search history.

(56) References Cited

U.S. PATENT DOCUMENTS

| 5,461,204 A   * | 10/1995 | Makinwa ............... G06F 3/046 |
| | | 178/19.03 |
| 2002/0070927 A1* | 6/2002 | Fujitsuka ............. G01D 5/2006 |
| | | 345/179 |

FOREIGN PATENT DOCUMENTS

JP    2002244806 A    8/2002

* cited by examiner

*Primary Examiner* — Claire X Pappas
*Assistant Examiner* — Sepideh Ghafari
(74) *Attorney, Agent, or Firm* — Seed Intellectual Property Law Group LLP

(57) ABSTRACT

A pen-shaped coordinate indicator is provided, which is capable of preventing erroneous detection of the pressing force (writing pressure) and widening the detection range of the pressing force. The indicator includes a core body that forms a pen tip; a columnar first magnetic body having one end in contact with the core body and having another end opposing a columnar second magnetic body; and an elastic body provided between the first and second magnetic bodies. The elastic body is composed of a main body and at least one projection provided thereon, wherein the projection has a smaller resistance to the pressing force applied to the core body than the main body. When the pressing force is applied, initially the projection is mainly deformed, and thereafter the main body is mainly deformed to thereby change a distance between the first and second magnetic bodies according to the pressing force device.

18 Claims, 17 Drawing Sheets

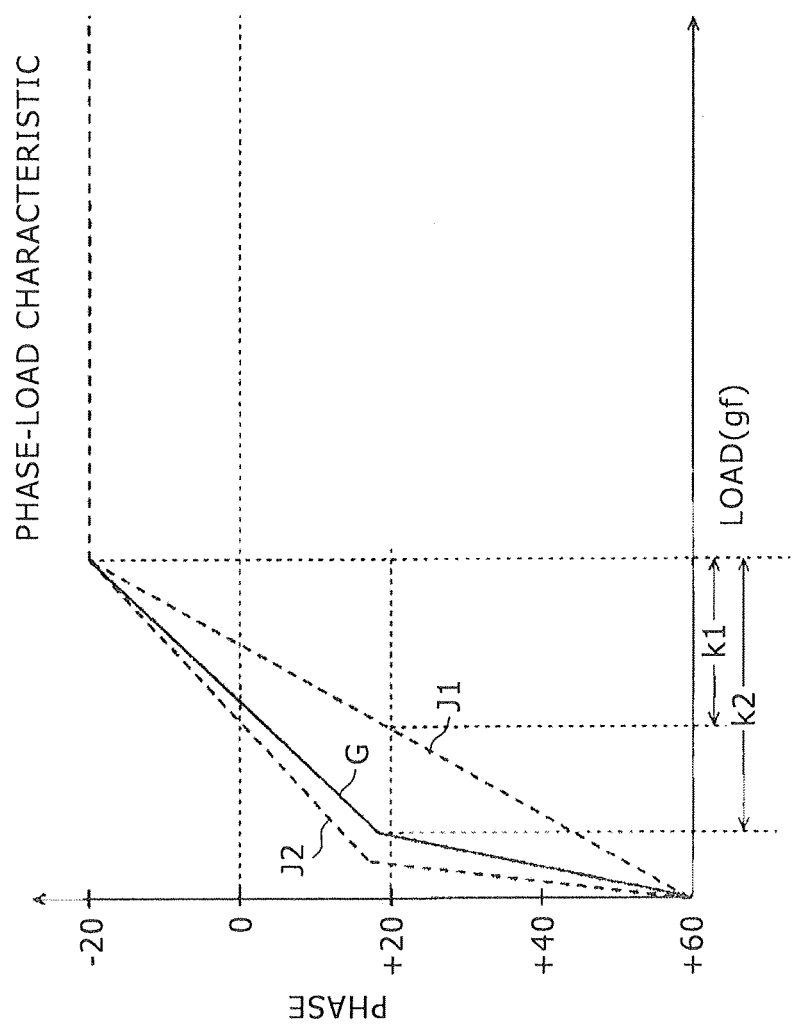

FIG.15A  FIG.15B
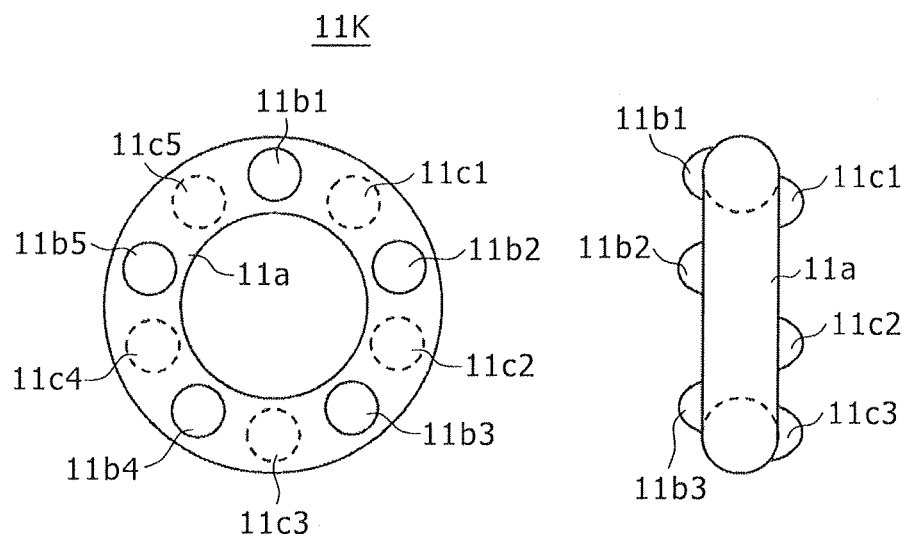
FIG.16A  FIG.16B
 
EXAMPLES OF SHAPE
OF PROTRUSION PARTS
11b AND 11c
FIG.16C  FIG.16D  FIG.16E
 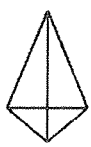 

SECTIONAL VIEW ALONG LINE X-X' IN FIG. 17B
(VARIATIONS OF RIDGE PARTS 11d AND 11e)

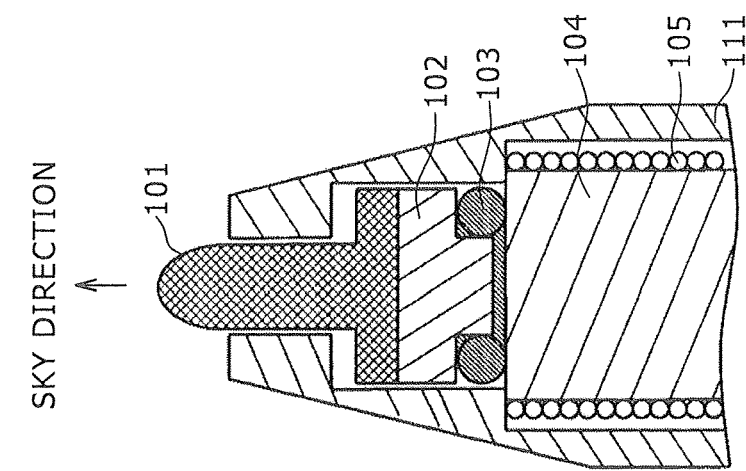
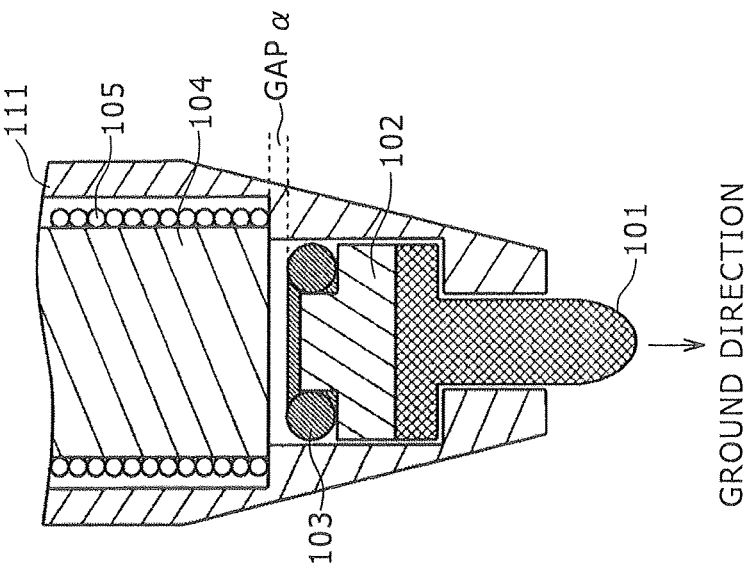

PEN-SHAPED COORDINATE INDICATOR

CROSS-REFERENCE TO RELATED APPLICATION(S)

The present application claims priority under 35 U.S.C. 119(a) of Japanese Application No. 2012-124021, filed May 31, 2012, the entire content of which is incorporated herein by reference.

BACKGROUND

Technical Field

This invention relates to a pen-shaped coordinate indicator that indicates a position to be detected to a position detecting device and that supplies operational information to the position detecting device.

Description of the Related Art

In recent years, a position input device is used as an input device such as a tablet PC (personal computer). A position input device is composed of, e.g., a coordinate indicator formed in a pen shape (pen-shaped coordinate indicator) and a position detecting device having an input surface, to which pointing operation and input of characters, figures, etc. are performed by using a pen-shaped coordinate indicator. FIG. 21 shows one example of the schematic configuration of a pen-shaped coordinate indicator 100 and a position detecting device 200 of a related art.

As shown at the upper left part of FIG. 21, the circuit configuration of a pen-shaped coordinate indicator 100 has a first ferrite (ferrite chip) 102 and a second ferrite (ferrite core) 104. Furthermore, at least one resonance capacitor 115 is connected to a coil 105 wound around the second ferrite 104. In FIG. 21 two resonant capacitors 115a and 115b are connected to the coil 105.

More specific configuration of the pen-shaped coordinate indicator 100 is shown in FIG. 22. FIG. 22 is a sectional view of the pen-shaped coordinate indicator 100 and shows the state in which the coil 105 is wound around the second ferrite 104. As shown in FIG. 22, the pen-shaped coordinate indicator 100 has a configuration in which the first ferrite 102 and the second ferrite 104, around which the coil 105 is wound, are made to oppose each other with the intermediary of an O-ring 103. Furthermore, it has such a configuration that application of pressing force (writing pressure) to a core body 101 brings the first ferrite 102 closer to the second ferrite 104.

The O-ring 103 is a ring-shaped member formed of synthetic resin, synthetic rubber, etc. to have a shape of the alphabet "O" (circular shape). Furthermore, in the pen-shaped coordinate indicator 100, besides the above-described parts, a board holder 113, a board 114, a resonant capacitor 115, a ring-shaped film 117 as a buffer material, and a buffer member 118 are housed in a hollow case 111, as shown in FIG. 22. Their positions in the case 111 are fixed by a cap 112. A resonant circuit 116 is configured by connecting the coil 105 wound around the second ferrite 104 to the resonant capacitor 115.

When the first ferrite 102, against which the core body 101 forming the pen tip abuts, gets closer to the second ferrite 104 according to the pressing force applied to the core body, the inductance of the coil 105 changes correspondingly. As a result, the cycle (resonant frequency) of the oscillation of radio waves transmitted from the coil 105 of the resonant circuit 116 changes.

On the other hand, as shown in FIG. 21, the position detecting device 200 has a position detection coil 210 obtained by stacking an X-axis-direction loop coil group 211 and a Y-axis-direction loop coil group 212. The respective loop coil groups 211 and 212 are each composed of forty rectangular loop coils, for example. The respective loop coils configuring the loop coil groups 211 and 212 are so disposed as to be arranged at equal intervals and sequentially overlap with each other. These X-axis-direction loop coil group 211 and Y-axis-direction loop coil group 212 are connected to a selection circuit 213. The selection circuit 213 sequentially selects one loop coil among the two loop coil groups 211 and 212.

An oscillator 221 generates an alternate current signal, namely, AC signal with a frequency f0 and supplies it to a current driver 222 and a coherent detector 229. The current driver 222 converts the AC signal supplied from the oscillator 221 to a current and supplies it to a transmission-side terminal T of a switch connection circuit 223. The switch connection circuit 223 switches the connection target of the loop coil selected by the selection circuit 213 to either the transmission-side terminal T or a reception-side terminal R under control from a processing controller 233 to be described later.

Suppose that the loop coil selected by the selection circuit 213 is connected to the transmission-side terminal T of the switch connection circuit 223. In this case, the AC signal from the oscillator 221 is supplied to this selected loop coil via the current driver 222 and the transmission-side terminal T, to be transmitted to the pen-shaped coordinate indicator 100.

On the other hand, suppose that the loop coil selected by the selection circuit 213 is connected to the reception-side terminal R of the switch connection circuit 223. In this case, an induced voltage generated in the loop coil selected by the selection circuit 213 is supplied to a receiving amplifier 224 via the selection circuit 213 and the reception-side terminal R of the switch connection circuit 223. The receiving amplifier 224 amplifies the induced voltage supplied from the loop coil and supplies it to a detector 225 and the coherent detector 229.

The detector 225 detects the induced voltage generated in the loop coil, i.e., a reception signal from the resonant circuit of the pen-shaped coordinate indicator 100, and supplies it to a low-pass filter 226. The low-pass filter 226 has a cutoff frequency sufficiently lower than the above-described frequency f0. It converts the output signal of the detector 225 to a direct current signal, namely, DC signal and supplies it to a sample/hold circuit 227. The sample/hold circuit 227 holds the voltage value of the output signal of the low-pass filter 226 at predetermined timing, specifically at predetermined timing in the reception period, and supplies it to an A/D conversion circuit 228. The A/D conversion circuit 228 converts the analog output of the sample/hold circuit 227 to a digital signal and supplies it to the processing controller 233.

The coherent detector 229 generates two orthogonal signals (0° and 90° from the AC signal from the oscillator 221 and multiplies the output signal of the receiving amplifier 224 by the generated signals to detect the phase difference. A low-pass filter 230 has a cutoff frequency sufficiently lower than the frequency f0. It converts the output signal of the coherent detector 229 to a DC signal and supplies it to a sample/hold circuit 231. The sample/hold circuit 231 holds the voltage value of the output signal of the low-pass filter 230 at predetermined timing and supplies it to an A/D conversion circuit 232. The A/D conversion circuit 232 converts the analog output of the sample/hold circuit 231 to a digital signal and supplies it to the processing controller 233.

The processing controller 233 controls the respective units of the position detecting device 200. Specifically, the processing controller 233 controls selection of the loop coil in the selection circuit 213, switch of the switch connection circuit 223, and the timing of the sample/hold circuits 227 and 231. The processing controller 233 causes radio waves to be transmitted from the X-axis-direction loop coil group 211 and the Y-axis-direction loop coil group 212 for a certain transmission continuation time.

An induced voltage is generated in the respective loop coils of the X-axis-direction loop coil group 211 and the Y-axis-direction loop coil group 212 by radio waves transmitted from the pen-shaped coordinate indicator 100. The processing controller 233 calculates the coordinate values of the position indicated by the pen-shaped coordinate indicator 100 along the X-axis direction and the Y-axis direction based on the level of the voltage value of the induced voltage generated in the respective loop coils. Furthermore, from the result of the cycle (phase) detection of 0° and 90°, the processing controller 233 performs predetermined arithmetic operation to calculate the phase value and additionally calculates the writing pressure value based on the phase value.

In this manner, in the related-art position input device composed of the pen-shaped coordinate indicator 100 and the position detecting device 200, it is possible to detect not only the position indicated by the pen-shaped coordinate indicator 100 but also the pressing force applied to the pen-shaped coordinate indicator 100, i.e., the writing pressure. Details of the related-art pen-shaped coordinate indicator 100 illustrated in FIGS. 21 and 22 are described in Patent Document 1 shown below.

[Patent Document 1]

Japanese Patent Laid-open No. 2002-244806

BRIEF SUMMARY

In the position detecting device 200 of the related-art position input device illustrated in FIGS. 21 and 22, it is detected that a writing pressure is applied to the core body 101 if a change in the cycle of the oscillation of radio waves (phase of radio waves) from the resonant circuit of the pen-shaped coordinate indicator 100 exceeds a predetermined threshold. The purpose of setting the predetermined threshold is to prevent erroneous detection of the writing pressure. Specifically, the inductance of the coil 105 changes even when the pen-shaped coordinate indicator 100 is merely inclined relative to the position detecting device 200. In this case, the cycle of the oscillation of radio waves sent out from the resonant circuit of the pen-shaped coordinate indicator 100 changes, which possibly leads to erroneous detection of the writing pressure. Therefore, a so-called dead zone is created by setting the threshold as a detection margin so that the state in which a writing pressure is truly applied can be accurately detected.

However, in the structure of the pen-shaped coordinate indicator 100, its pen tip part alone is composed of the core body 101, the first ferrite 102, the O-ring 103, and the second ferrite 104, around which the coil 105 is wound, in series. These respective constituent members are produced in large numbers at one time. Therefore, size differences, though slight, often result among the same constituent members. As described above, the pen-shaped coordinate indicator 100 is so delicate that erroneous detection of the writing pressure occurs even when it is only inclined, and the size differences among the constituent members could lead to erroneous detection of the writing pressure.

For example, the material of the O-ring 103 is synthetic resin or synthetic rubber as described above. In manufacturing, synthetic resin or synthetic rubber is injected into a mold form, in which a large number of molds are formed. In this case, depending on, e.g., how the synthetic resin or synthetic rubber is injected into the mold form, size differences often result even among the O-rings 103 that are simultaneously manufactured. The O-ring 103 is designed to be in contact with the first ferrite 102 and the second ferrite 104 as shown in FIG. 22. However, possibly a slight gap a is generated between the O-ring 103 and the second ferrite 104 in the state in which the core body 101 of the pen-shaped coordinate indicator 100 is pointed toward the ground direction as shown in FIG. 23A when the thickness of the O-ring 103 is slightly smaller than the intended thickness.

In such a pen-shaped coordinate indicator 100, the first ferrite 102 gets closer to the second ferrite 104 merely by pointing the core body 101 upward (pointing toward the sky direction) as shown in FIG. 23B. In this case, because the cycle of the oscillation of radio waves transmitted from the resonant circuit of the pen-shaped coordinate indicator 100 changes, possibly erroneous detection of the writing pressure occurs. Specifically, possibly erroneous detection of the writing pressure is caused when the pen-shaped coordinate indicator 100 is used with the core body 101 pointed toward the sky direction, such as when a user uses a high-function cell-phone terminal called a smartphone while lying on the user's back.

To address this problem, it is possible to adjust the capacitance of the capacitor side in the state in which the first ferrite 102 is brought close to the second ferrite 104 with the intermediary of the O-ring 103 by orienting the pen-shaped coordinate indicator 100 toward the sky direction. However, adjusting the capacitance of the capacitor side with the pen-shaped coordinate indicator 100 oriented toward the sky direction needs the jig dedicated for making the adjustment. Furthermore, the adjustment work in the sky-oriented state significantly lowers the work efficiency and possibly decreases the production volume and increases cost.

Furthermore, in the case of the pen-shaped coordinate indicator 100 adjusted with the core body 101 oriented toward the sky direction, when it is used with the core body 101 oriented toward the ground direction, the first ferrite 102 gets separated from the second ferrite 104 and thus the inherent resonant frequency greatly deviates from the originally intended signal frequency. Therefore, when it is used with the core body 101 oriented toward the ground direction, the signal level when the core body 101 is not pressed may undesirably decrease and the height at which the pen-shaped coordinate indicator 100 can be detected by the position detecting device 200 shown in FIG. 21, i.e., the "readable height" may decrease. As described above, an error in the size of the constituent member near the core body 101 of the pen-shaped coordinate indicator 100, particularly an error in the size of the O-ring 103, possibly hinders mass-production of the low-cost, high-quality pen-shaped coordinate indicator 100.

Furthermore, in the case of the related-art pen-shaped coordinate indicator 100 shown in FIG. 22, the writing pressure detection range is a somewhat limited range. Specifically, in the related-art pen-shaped coordinate indicator 100 shown in FIG. 22, a high writing pressure (load) needs to be applied to the core body 101 of the pen-shaped coordinate indicator 100 to bring the first ferrite 102 closer to the second ferrite 104 in such a manner as to squash the O-ring 103. In the case of squashing the O-ring 103, there is a limit to the deformation of the O-ring 103. Therefore, when pressing force higher than a certain level is applied via the core body 101, the first ferrite 102 abuts against the second ferrite 104.

In this case, the distance between the first ferrite 102 and the second ferrite 104 does no longer become shorter and it becomes impossible to change the cycle of the oscillation of radio waves from the resonant circuit of the pen-shaped coordinate indicator 100 in association with the pressing force. In addition, a predetermined threshold needs to be set for a change in the cycle of the oscillation of radio waves from the resonant circuit of the pen-shaped coordinate indicator 100, as described above. Therefore, the load change range in which the pressing force (writing pressure) can be detected is rather small.

As one solution to this problem, a method may be employed in which a certain level of gap is set between the O-ring 103 and the second ferrite 104 with the core body 101 oriented toward the ground direction. In this case, the first ferrite 102 can be brought closer to the second ferrite 104 by only applying a very light pressing force to the core body 101. This makes it possible to rapidly generate a change leading to the threshold for pressing detection to thereby widen the change range for writing pressure detection. Furthermore, in this method, no modification needs to be made to the respective parts configuring the pen-shaped coordinate indicator 100. Thus, this method can be implemented relatively easily.

However, in the case of the related-art pen-shaped coordinate indicator 100 of the modified type using this method, the same problem as that of the case illustrated in FIG. 23 occurs. Specifically, the first ferrite 102 gets closer to the second ferrite 104 merely by orienting the core body 101 upward (orienting it toward the sky direction) in this related-art pen-shaped coordinate indicator 100 of the modified type. If the pen-shaped coordinate indicator 100 is used in such a situation, because the frequency of radio waves from the resonant circuit of the pen-shaped coordinate indicator 100 changes merely by orienting the core body 101 toward the sky direction, a writing pressure is possibly detected even when the core body 101 is not in contact with the detection surface of the position detecting device 200.

In view of the above, according to one aspect, the invention is directed to eliminating the above-described problems to realize a pen-shaped coordinate indicator of a position input device, which is capable of preventing erroneous detection of the pressing force (writing pressure) and widening the detection range of the pressing force applied to the pen tip to allow a change in the pressing force to be detected more properly.

Means for Solving the Problems

To solve the above-described problems, a pen-shaped coordinate indicator according to an aspect of this invention includes a core body that projects from one end of a chassis to form a pen tip, a columnar first magnetic body whose one (first) end surface is in contact with the core body, and a columnar second magnetic body whose one end surface is opposed to the other (second) end surface of the first magnetic body. The pen-shaped coordinate indicator further includes a coil wound around at least one of the first and second magnetic bodies, a capacitor connected to the coil, and an elastic body that is provided between opposing end surfaces of the first magnetic body and the second magnetic body and is deformed by application of a pressing force by a user to the core body. The elastic body is composed of a main body part and a projection provided on the main body part and the projection has a smaller resistance against the pressing force compared with the main body part. The main body part and the projection position the first magnetic body and the second magnetic body to be separated from each other in a state in which the pressing force is not applied to the core body. When the pressing force is applied to the core body, initially the projection is mainly deformed, and after the projection is deformed, the main body part is mainly deformed and the distance between the first magnetic body and the second magnetic body is changed depending on the pressing force to thereby detect the pressing force.

According to the pen-shaped coordinate indicator of the aspect of this invention, one (second) end surface of the columnar first magnetic body is opposed to one end surface of the columnar second magnetic body, and the other (first) end surface of the columnar first magnetic body abuts against the core body configuring the pen tip. The coil is wound around at least one of the first and second magnetic bodies and this coil is connected to a capacitor to configure a resonant circuit. The elastic body is provided between the opposing end surfaces of the first magnetic body and the second magnetic body. This elastic body has a configuration in which the projection is provided on the main body part and is so made that the resistance of the projection is smaller than that of the main body part against the pressing force.

In the state in which the pressing force from the user is not applied to the core body, the main body part and the projection position the first magnetic body and the second magnetic body to be separated from each other. This can prevent erroneous detection of the writing pressure when the core body is oriented upward. When the pressing force from the user is applied to the core body, initially the projection having the smaller resistance is rapidly deformed, and thereafter the main body part having the larger resistance is deformed pursuant to the pressing force. This operation can enlarge the detection range of the pressing force applied to the core body.

More generally, the elastic body for positioning the first magnetic body and the second magnetic body to be separated from each other is formed of the same material and may consist of plural parts or an integral (continuous) structure. The respective parts form a structure, in which the resistance against the pressing force differs on a part-by-part basis and are characterized in that the individual parts are disposed in series between the first magnetic body and the second magnetic body. The structure in which the resistance against the pressing force differs on a part-by-part basis includes the case in which the density of the material and the compression rate differ on a part-by-part basis. Examples of such a case include the case in which the elastic body has a sponge structure and the density of the material forming the sponge differs. The examples will also include the case in which the elastic body has a spring structure and the diameter of the spring coil differs depending on each portion.

Effect of the Invention

According to the aspect of this invention, it is possible to realize, e.g., a pen-shaped coordinate indicator of a position input device, capable of preventing erroneous detection of the pressing force (writing pressure) when the core body is oriented upward and widening the detection range of the pressing force applied to the pen tip to allow a change in the pressing force to be detected more properly.

BRIEF DESCRIPTION OF THE SEVERAL VIEWS OF THE DRAWINGS

FIG. 4 is a phase-load characteristic diagram for explaining the characteristic of a related-art pen-shaped coordinate indicator and the characteristic of the pen-shaped coordinate indicator of this embodiment.

FIGS. 15A and 15B are diagrams for explaining modification example 11 of the ring portion.

FIGS. 16A to 16E are diagrams for explaining variations of the shape of projection parts.

FIGS. 23A and 23B are diagrams for explaining one example of the related-art pen-shaped coordinate indicator of an improved type.

DETAILED DESCRIPTION

A pen-shaped coordinate indicator according to one embodiment of this invention will be specifically described below with reference to the drawings.
[Use Example of Pen-Shaped Coordinate Indicator 1]

Figure 1:
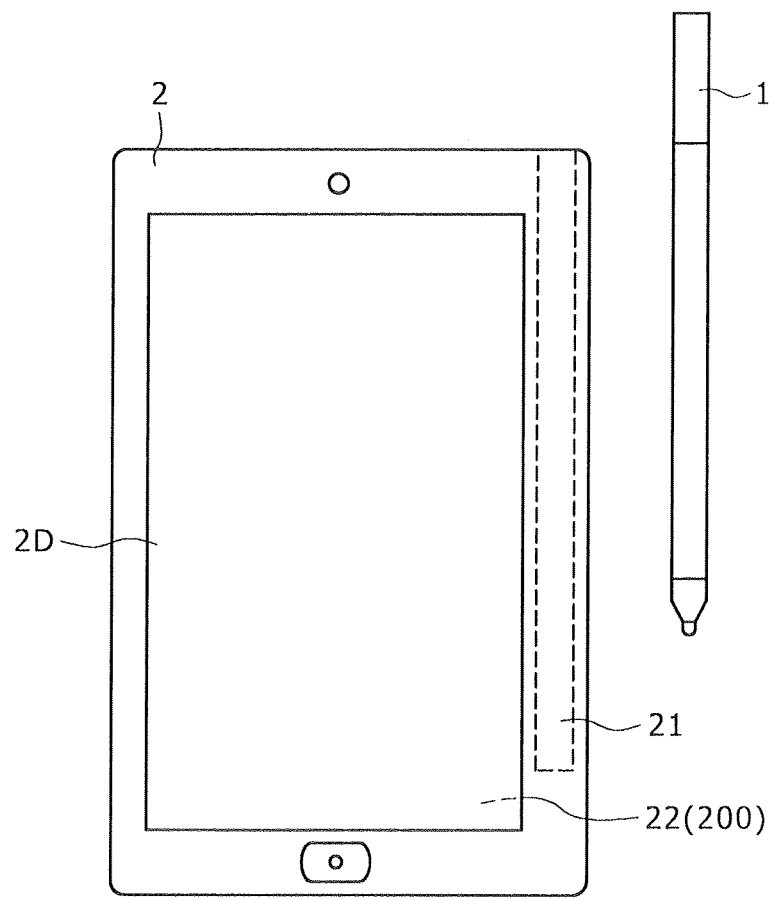
FIG. 1 is a diagram for explaining one example of electronic apparatus using a pen-shaped coordinate indicator of an embodiment of this invention.

FIG. 1 shows one example of electronic apparatus 2 using a pen-shaped coordinate indicator 1 of this embodiment. In this example, the electronic apparatus 2 is, e.g., a high-function cell-phone terminal having a display screen 2D of a display device such as a liquid crystal display (LCD) and includes a position detecting device 22 of the electromagnetic induction system in the back part of the display screen 2D. This position detecting device 22 is configured similarly to the related-art position detecting device 200 shown in FIG. 23.

The chassis of the electronic apparatus 2 of this example has a housing recess 21 to house the pen-shaped coordinate indicator 1. The user takes out the pen-shaped coordinate indicator 1 housed in the housing recess 21 from the electronic apparatus 2 according to a need to carry out position indication operation on the display screen 2D.

Suppose that position indication operation is performed with the pen-shaped coordinate indicator 1 on the display screen 2D in the electronic apparatus 2. In this case, the position detecting device 22 provided in the back part of the display screen 2D detects the position at which the operation is performed with the pen-shaped coordinate indicator 1 and the writing pressure, and a microcomputer included in the position detecting device 22 of the electrode apparatus 2 executes display processing depending on the operation position on the display screen 2D and the writing pressure.
[Configuration of Pen-shaped Coordinate Indicator 1]

Figure 2:
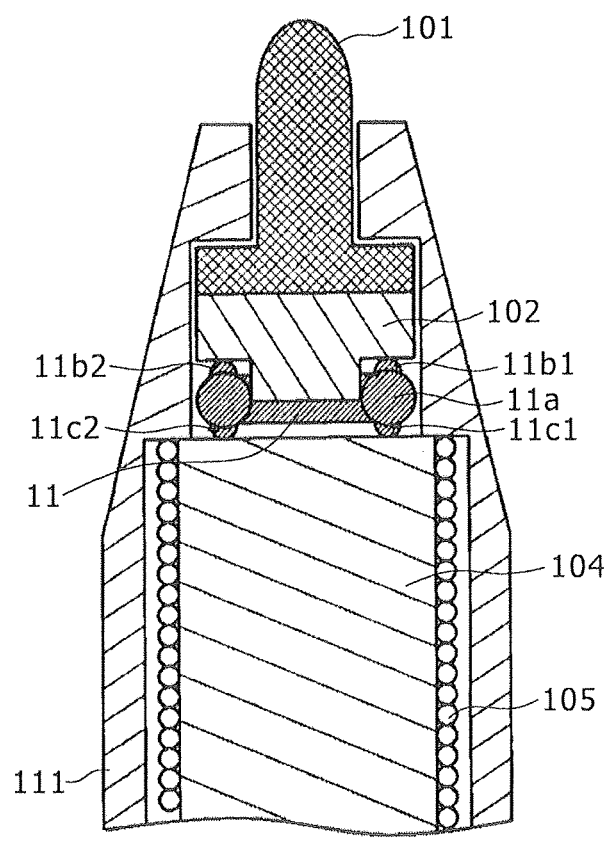
FIG. 2 is a diagram for explaining the pen-shaped coordinate indicator of the embodiment of this invention.

A configuration example of the pen-shaped coordinate indicator 1 of this embodiment will be described below. FIG. 2 is a sectional view of the pen tip side of the pen-shaped coordinate indicator 1 of this embodiment and is a diagram for explaining the major part of the pen-shaped coordinate indicator 1 of this embodiment. In FIG. 2, a case 111 (chassis) is a chassis that is made of, e.g., a synthetic resin such as an ABS resin (acrylonitrile-butadiene-styrene resin) and is formed to imitate conventional writing equipment such as ballpoint pens and mechanical pencils but in a smaller size. The case 111 is hollow so that the respective members can be housed therein. Furthermore, the case 111 is so formed that at least one end part thereof is tapered as shown in FIG. 2, and its tip has an opening.

As shown in FIG. 2, the pen-shaped coordinate indicator 1 of this embodiment includes a core body 101 projecting from one end of the case 111. The section of the core body 101 has a T-shape as shown in FIG. 2, and a portion of the core body 101 is engaged with a portion of the case 111 of the pen-shaped coordinate indicator 1 so that the core body 101 may be prevented from projecting from the case 111 more than necessary. The core body 101 is made of, e.g., a synthetic resin such as a polyacetal resin (DURACON) to achieve durability against friction when it is used in contact with the operation surface.

As shown in FIG. 2, the pen-shaped coordinate indicator 1 has a circular columnar first ferrite (first magnetic body) 102 whose one (first) end surface is in contact with the core body 101. Furthermore, the pen-shaped coordinate indicator 1 has a circular columnar second ferrite (second magnetic body) 104 whose one end surface is opposed to the other (second) end surface of this first ferrite 102. A coil 105 is wound on the side surface of this second ferrite 104. The second ferrite 104 is fixed at a predetermined position in the case 111 and is prevented from moving.

The first ferrite is composed of a larger-diameter columnar part and a smaller-diameter columnar that are coaxial, as shown by the section in FIG. 2. As shown in FIG. 2, the larger-diameter columnar part of the first ferrite 102 is in contact with the core body 101 and the smaller-diameter columnar part is located on the side of the second ferrite 104. Furthermore, a ring portion 11 (elastic body) formed of an elastic body such as synthetic resin or synthetic rubber is provided between the opposing end surfaces of the first ferrite 102 and the second ferrite 104 as shown in FIG. 2. The smaller-diameter columnar part of the first ferrite 102 is fitted into the hole part (penetration hole) of the ring portion 11.

As described above, the core body 101 is prevented from projecting from the case 111 more than necessary. However, it can slide along the longitudinal (axial) direction of the case 111 when the user applies a pressing force thereto. Therefore, when a pressing force is applied to the core body 101, the core body 101, the first ferrite 102, and the ring portion 11 are pressed against the second ferrite 104.

The ring portion 11 is deformed depending on the pressing force (writing pressure) applied to the core body 101 because it is formed of an elastic body such as synthetic resin or synthetic rubber as described above, and the first ferrite 102 gets closer to the second ferrite 104 depending on the pressing force. Due to this, the inductance of the coil 105 wound around the second ferrite 104 changes depending on the position of the first ferrite 102 relative to the second ferrite 104, so that the output associated with the pressing force (writing pressure) can be obtained.

As described in detail later, the ring portion 11 has a main body part 11a having a ring-like three-dimensional shape formed to have a section of an "O"-shape (circular shape). As shown in FIG. 2, on this main body part 11a, protrusion parts (projections) 11b1 and 11b2 that separate the main body part 11a from the first ferrite 102 and protrusion parts (projections) 11c1 and 11c2 that separate the main body part 11a from the second ferrite 104 are provided. These protrusion parts 11b1, 11b2, 11c1, and 11c2 are formed of the same material as that of the main body part 11a. In this embodiment, the ring portion 11 composed of the main body part 11a, the protrusion parts 11b1 and 11b2, and the protrusion parts 11c1 and 11c2 is obtained by integral molding.

Figure 22:
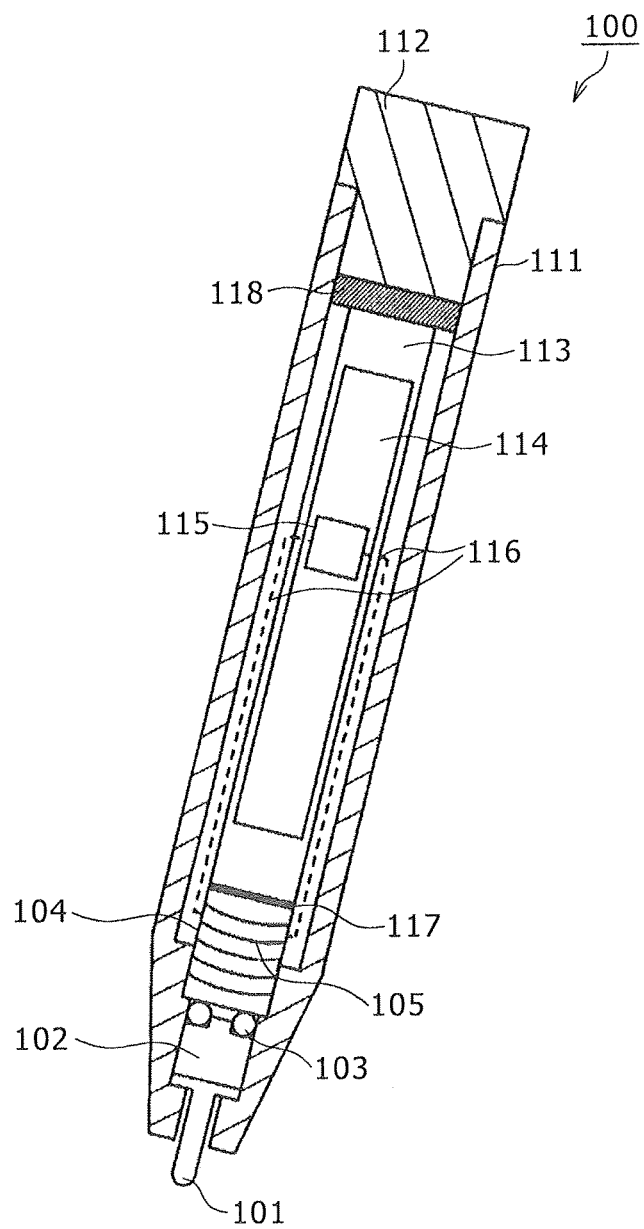
FIG. 22 is a diagram for explaining one example of the related-art pen-shaped coordinate indicator.

As above, the pen-shaped coordinate indicator 1 of this embodiment includes the ring portion 11 made by providing the protrusion parts 11b1, 11b2, 11c1, and 11c2 on the main body part 11a instead of the O-ring 103 included in the related-art pen-shaped coordinate indicator 100 shown in FIGS. 22 and 23. In the pen-shaped coordinate indicator 1 of this embodiment, the respective parts other than the ring portion 11 are configured similarly to the related-art pen-shaped coordinate indicator 100 explained by using FIGS. 22 and 23.

[Shape of Ring Portion 11]

Figure 3A:
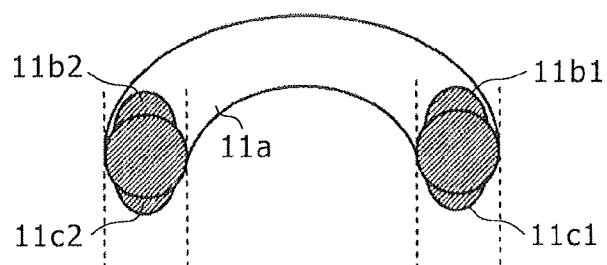
FIGS. 3A to 3C are diagrams for explaining the specific shape of a ring portion.
Figure 3B:
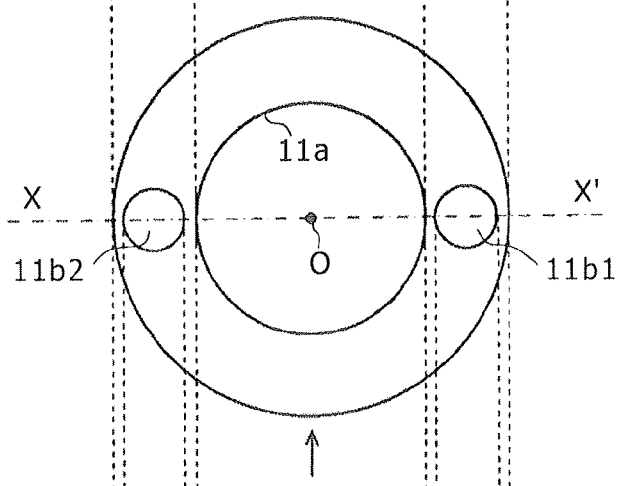
Figure 3C:
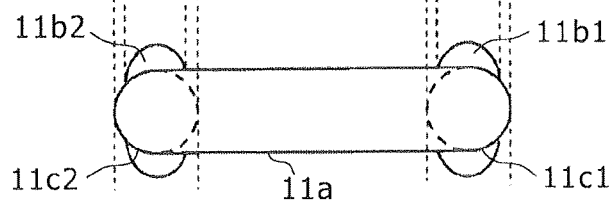

FIG. 3 is a diagram for explaining the shape of the ring portion 11 used in the pen-shaped coordinate indicator 1 of this embodiment. An X-X' sectional view shown in FIG. 3A shows a section when the ring portion 11 of FIG. 3B is cut at the position shown by a straight line X-X' passing through the center O of the ring portion 11 in a top view of the ring portion 11. A side view shown in FIG. 3C shows a side when the ring portion 11 is viewed from the direction shown by the arrow in FIG. 3B (this applies also to side views of other drawings).

As shown in the top view of FIG. 3B, in the ring portion 11 of this embodiment, two protrusion parts 11b1 and 11b2 are provided on the main body part 11a formed into a ring shape. FIG. 3 shows the case in which the protrusion parts 11b1 and 11b2 are provided on the main body part 11a and on the straight line X-X' passing through the center of the ring portion 11 in this embodiment. That is, two protrusion parts 11b1 and 11b2 are provided at positions on the main body part 11a that are point-symmetric relative to the center O of the ring portion 11.

As shown in the sectional view of FIG. 3A, the section of the main body part 11a has a shape of the alphabet "O" (circular shape) and the sections of the protrusion parts 11b1 and 11b2 have a substantially semicircular shape. That is, the main body part 11a has a circular sectional shape and has a ring-like three-dimensional shape as a whole. The protrusion parts 11b1 and 11b2 have a substantially hemispherical three-dimensional shape. As shown in the sectional view of FIG. 3A, the protrusion parts 11c1 and 11c2 are provided on the main body part 11a on the opposite side across the main body part 11a from the side on which the protrusion parts 11b1 and 11b2 are formed. The protrusion parts 11c1 and 11c2 have a substantially semicircular sectional shape and a substantially hemispherical three-dimensional shape similarly to the protrusion parts 11b1 and 11b2.

That is, as shown in the side view of FIG. 3C, the ring portion 11 of this embodiment is composed of the main body part 11a and the protrusion parts 11b1 and 11b2 and the protrusion parts 11c1 and 11c2 provided at positions on the main body part 11a corresponding to each other across the main body part 11a. Furthermore, as shown also in FIG. 2, in the pen-shaped coordinate indicator 1 of this embodiment, the ring portion 11 is so disposed (mounted) that the protrusion parts 11b1 and 11b2 are located on the side of the first ferrite 102 and the protrusion parts 11c1 and 11c2 are located on the side of the second ferrite 104.

Therefore, in the state in which the pressing force is not applied to the core body 101, the protrusion parts 11b1 and 11b2 realize a function to position the main body part 11a to be separated from the first ferrite 102. Furthermore, in the state in which the pressing force is not applied to the core body 101, the protrusion parts 11c1 and 11c2 realize a function to position the main body part 11a to be separated from the second ferrite 104. Due to this feature, the gap between the first ferrite 102 and the second ferrite 104 can be made large corresponding to at least the heights of the protrusion part 11b1 and the protrusion part 11c1 (protrusion part 11b2 and protrusion part 11c2) in addition to the thickness of the main body part 11a of the ring portion 11.

Consider the case in which the core body 101 of the pen-shaped coordinate indicator 1 of this embodiment is oriented toward the sky direction. In this case, in the state in which the pressing force is not applied to the core body, the gap equal to the total of the thickness of the main body part 11a and the heights of the protrusion part 11b1 and the protrusion part 11c1 (protrusion part 11b2 and protrusion part 11c2) can be kept between the first and second ferrites as shown in FIG. 2.

In this manner, in the pen-shaped coordinate indicator 1 of this embodiment, the distance between the opposing end surfaces of the first ferrite 102 and the second ferrite 104 can be set longer than that in the related-art pen-shaped coordinate indicator. Furthermore, in the state in which the core body 101 is oriented toward the sky direction and the pressing force is not applied to the core body 101, the first ferrite 102 does not get closer to the second ferrite 104 beyond (shorter than) the distance of the heights of the main body part 11a, the protrusion parts 11b1 and 11b2, and the protrusion parts 11c1 and 11c2 along their stacking direction. Therefore, the inductance of the coil 105 does not change by simply orienting the core body 101 toward the sky direction. Thus, erroneous detection of the writing pressure does not occur.

It is enough for the protrusion parts 11b1 and 11b2 and the protrusion parts 11c1 and 11c2 to exert such an resistance that the first ferrite 102 does not get closer to the second ferrite 104 when the core body 101 forming the pen tip is oriented toward the sky direction. Therefore, the protrusion parts 11b1 and 11b2 and the protrusion parts 11c1 and 11c2 have a comparatively small area as the area of the part opposed to and in contact with the first ferrite 102 or the second ferrite 104 as shown in FIG. 3.

Therefore, immediately after the user starts to apply a pressing force (writing pressure) to the core body 101, only the protrusion parts 11b1 and 11b2 and the protrusion parts 11c1 and 11c2 provided on the main body part 11a are squashed. At this time, only a very slight pressing force is necessary and the provision of the protrusion parts 11b1 and 11b2 and the protrusion parts 11c1 and 11c2 on the main body part 11a does not provide much feeling of resistance to the user. The main resistance felt by the operator (user) when the operator presses the core body (pen tip) 101 against the operation surface is the resistance when the main body part 11a of the ring portion 11 starts to be pressed.

[Phase-Load Characteristic of Pen-shaped Coordinate Indicator 1]

FIG. 4 is a diagram showing a graph of the phase-load characteristic of the pen-shaped coordinate indicator. A line G in FIG. 4 shows the phase-load characteristic of the pen-shaped coordinate indicator 1 of this embodiment. A line J1 in FIG. 4 shows the phase-load characteristic of the related-art pen-shaped coordinate indicator 100 explained by using FIG. 22. A line J2 in FIG. 4 shows the phase-load characteristic of the related-art pen-shaped coordinate indicator of an improved type in which a predetermined gap is made between the O-ring 103 and the second ferrite 104 with the core body 101 oriented toward the ground direction.

That is, the related-art pen-shaped coordinate indicator of the improved type with the characteristic shown by the line J2 in FIG. 4 is intentionally formed into the same state as that of the pen-shaped coordinate indicator 100 shown in FIG. 23A by somewhat widening the gap between the first ferrite 102 and the second ferrite 104. FIG. 4 shows the case in which the threshold of the phase (cycle of the oscillation of radio waves from the resonant circuit of the pen-shaped coordinate indicator 1) in the case of detecting the pressing force (writing pressure) is set to +20.

In the case of the related-art pen-shaped coordinate indicator 100, the O-ring 103 exists between the first ferrite 102 and the second ferrite 104 as described by using FIG. 22. Therefore, a high pressing force (load) needs to be applied to the core body 101 of the pen-shaped coordinate indicator 100 to bring the first ferrite 102 closer to the second ferrite 104 in such a manner as to squash the O-ring 103. Furthermore, there is a limit as to the squashing of the O-ring 103.

Therefore, in the case of the related-art pen-shaped coordinate indicator 100, in the interval in which the load is comparatively light at the beginning of the pressing, the inductance of the coil 105 changes to a comparatively higher extent and a comparatively large phase change is obtained as shown by the line J1 in FIG. 4. However, after the first ferrite 102 abuts against the second ferrite 104, the gap cannot be narrowed any further and the phase does not change at a predetermined value as the upper limit.

Also as described above, the phase change in the related-art pen-shaped coordinate indicator 100 is not detected until the phase surpasses the predetermined threshold in order to properly detect the pressing force. Because FIG. 4 shows the case in which the threshold of the phase is set to +20, the pressing force (writing pressure) can be detected only in the interval shown as a load interval k1 in FIG. 4 in the case of the related-art pen-shaped coordinate indicator 100 having the characteristic shown by the line J1 in FIG. 4.

Next, a consideration will be made about the phase-load characteristic of the related-art pen-shaped coordinate indicator of the improved type, in which a certain level of gap is set between the O-ring 103 and the second ferrite 104 with the core body 101 oriented toward the ground direction. In the case of this related-art pen-shaped coordinate indicator of the improved type, also as described above, a certain level of gap exists between the O-ring 103 and the second ferrite 104 similarly to the pen-shaped coordinate indicator 100 shown in FIG. 23A.

Therefore, the first ferrite 102 rapidly gets closer to the second ferrite 104 by only applying a light pressing force to the core body 101 until the O-ring 103 comes in contact with both the first ferrite 102 and the second ferrite 104. In this case, the inductance of the coil 105 greatly changes. Thus, as shown by the line J2 in FIG. 4, a large phase change is obtained at the beginning of the pressing and the phase rapidly reaches the predetermined threshold (phase=+20) with a light pressing force.

Then, after the O-ring 103 comes in contact with the first ferrite 102 and the second ferrite 104, the O-ring 103 is deformed depending on the pressing force applied to the O-ring 103 and the first ferrite 102 gets closer to the second ferrite 104. Therefore, as shown by the line J2 in FIG. 4, the phase change is also gentle after the phase surpasses the threshold. It turns out that, in the case of the related-art pen-shaped coordinate indicator of the improved type having such a characteristic, the load range in which the pressing force (writing pressure) can be detected is greatly widened compared with the related-art pen-shaped coordinate indicator 100 having the phase-load characteristic shown by the line J1.

However, in the case of this related-art pen-shaped coordinate indicator of the improved type, the first ferrite 102 gets closer to the second ferrite 104 just by orienting the core body 101 toward the sky direction and possibly erroneous detection of the pressing force is caused. The same occurs also when the O-ring 103 is formed to have a thickness slightly smaller than the target thickness as described by using FIG. 23.

In contrast to these related-art pen-shaped coordinate indicators 100 (FIGS. 22 and 23), the ring portion 11 of the pen-shaped coordinate indicator 1 of this embodiment has a configuration obtained by providing the protrusion parts 11b1 and 11b2 and the protrusion parts 11c1 and 11c2 on the main body part 11a. Therefore, in the state in which the pressing force is not applied to the core body 101, the first ferrite 102 does not get closer to the second ferrite 104 beyond (shorter than) the total of the thickness of the main body part 11a and the heights of the protrusion part 11b1 and the protrusion part 11c1 (protrusion part 11b2 and protrusion part 11c2) even when the core body 101 is oriented toward the sky direction for example.

When a pressing force is applied to the core body 101, first the protrusion parts 11b1 and 11b2 and the protrusion parts 11c1 and 11c2 are deformed. However, as described above, the protrusion parts 11b1 and 11b2 and the protrusion parts 11c1 and 11c2 exert only such a slight resistance that is sufficient to prevent the first ferrite 102 from coming closer to the second ferrite 104 when the core body 101 forming the pen tip is oriented toward the sky direction.

Thus, although a slightly higher pressing force is necessary compared with the related-art pen-shaped coordinate indicator of the improved type having the characteristic shown by the line J2, the protrusion parts 11b1 and 11b2 and the protrusion parts 11c1 and 11c2 are deformed by only applying a light pressing force to the core body 101 in the pen-shaped coordinate indicator 1 of the embodiment. In this case, the first ferrite 102 rapidly gets closer to the second ferrite 104 until the whole of the main body part 11a of the ring portion 11 starts to be pressed (until the resistance of the main body part 11a becomes dominant). Therefore, as shown by the line G in FIG. 4, the load (pressing force) that is necessary until the phase reaches the threshold is slightly higher compared with the related-art pen-shaped coordinate indicator of the improved type. However, a large phase change is obtained at the beginning of the pressing and the phase rapidly reaches the predetermined threshold (phase=+ 20) with a light pressing force.

Then, the resistance of the main body part 11a is dominant after the protrusion parts 11b1 and 11b2 and the protrusion parts 11c1 and 11c2 are deformed and the pressing force begins to be applied to the whole of the main body part 11a. Therefore, the main body part 11a is deformed depending on the pressing force applied to the main body part 11a and the first ferrite 102 gets closer to the second ferrite 104. Accordingly, as shown by the line G in FIG. 4, the phase change is also gentle after the phase surpasses the threshold. The load range in which the pressing force (writing pressure) can be detected in the pen-shaped coordinate indicator 1 of this embodiment can be greatly widened as shown by a load interval k2 in FIG. 4. The difference from the load interval k1, which shows the load range in which the pressing force can be detected in the related-art pen-shaped coordinate indicator 100, is obvious.

[Effects of Pen-Shaped Coordinate Indicator 1 of Embodiment]

As described above, the pen-shaped coordinate indicator 1 of this embodiment does not cause erroneous detection of the pressing force (writing pressure) even when the core body 101 is oriented toward the sky direction due to the function of the ring portion 11 composed of the main body part 11a, the protrusion parts 11b1 and 11b2, and the protrusion parts 11c1 and 11c2. Furthermore, the detection range of the pressing force (writing pressure) applied to the core body 101 can be greatly enlarged compared with the related-art pen-shaped coordinate indicator 100. In addition, there is no need to make significant modification to the constituent parts other than the ring portion 11.

Moreover, there is no need for work such as adjustment of the capacitor capacitance in the state in which the core body 101 is oriented toward the sky direction, carried out in consideration of, e.g., the occurrence of an error in the size of the O-ring explained by using FIG. 23. Thus, it does not involve significantly increasing the number of production steps for effecting such adjustment. Accordingly, the production volume of the pen-shaped coordinate indicator can be increased while suppressing increase in the manufacturing cost. Furthermore, the pen-shaped coordinate indicator 1 of the embodiment does not cause lowering of the reading height under the situation in which the core body configuring the pen tip is not pressed, which is possibly caused due to the occurrence of an error in the size of the constituent member such as the O-ring 103 in the related art. Of course, there is also no need for an additional tool for the adjustment work for the capacitor capacitance in the state in which the core body 101 is oriented toward the sky direction.

Furthermore, the lowering of the yield due to a fault in the related-art pen-shaped coordinate indicator in which the error in the size of the constituent member such as the O-ring 103 is large is suppressed, so that wasting of the material can be reduced.

In addition, a pen-shaped coordinate indicator is realized, in which the resistance at the start of application of a pressing force to the core body is small and with which a desirable usage feeling of operation can be obtained.

That is, as a whole, it is possible to provide an unprecedented prominent effect that a high-performance, high-quality pen-shaped coordinate indicator can be mass-produced without causing increase in the manufacturing steps and the cost.

[Modification Examples of Ring Portion 11]

The ring portion 11 is not limited to that having the configuration explained by using FIGS. 2 and 3. The ring portion 11 can have various forms as described below. First, specific descriptions will be made below about modification examples of the ring portion 11 obtained by providing plural protrusion parts having a substantially hemispherical three-dimensional shape for the ring-shaped main body part 11a as explained by using FIGS. 2 and 3. Also when the respective modification examples of the ring portion 11 to be described below are used for the pen-shaped coordinate indicator 1, the same effects as those when the above-described ring portion 11 is used are achieved.

[Modification Example 1 of Ring Portion 11 (Two Protrusion Parts on Single Side)]

Figures 5A, 5B:
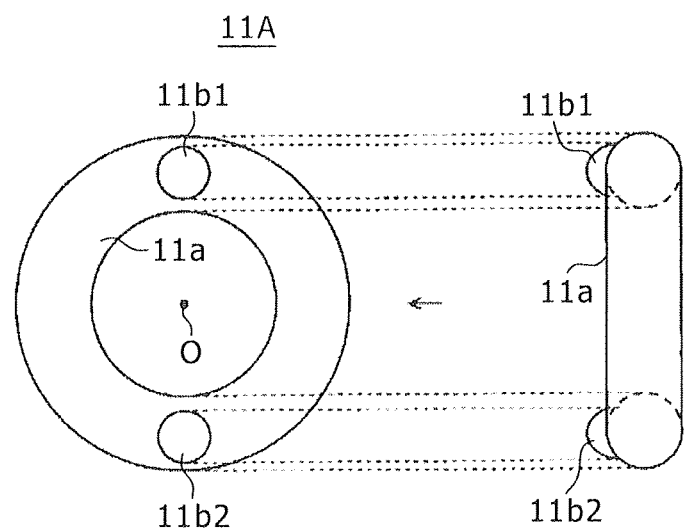
FIGS. 5A and 5B are diagrams for explaining modification example 1 of the ring portion.

FIG. 5 is a diagram for explaining a ring portion 11A (modification example 1 of the ring portion 11). In FIG. 5, FIG. 5A is a top view of the ring portion 11A and FIG. 5B is a side view when the ring portion 11A is viewed from the direction of the arrow shown in FIG. 5.

On the main body part 11a of the ring portion 11A shown in FIG. 5, two protrusion parts 11b1 and 11b2 are provided at positions that are point-symmetric about the center O of the ring portion 11A. However, in the case of the ring portion 11A, the protrusion parts 11b1 and 11b2 are provided only on the side of the main body part 11a opposed to the first ferrite 102 or only on the side of the main body part 11a opposed to the second ferrite 104 as shown in FIG. 5B.

Consider the case in which the core body 101 of the pen-shaped coordinate indicator 1 using this ring portion 11A is oriented toward the sky direction. In this case, in the state in which the pressing force is not applied to the core body 101, the protrusion parts 11b1 and 11b2 realize a function to position the main body part 11a to be separated from the first ferrite 102 or the second ferrite 104 by the height of the protrusion parts 11b1 and 11b2.

[Modification Example 2 of Ring Portion 11 (Two Protrusion Parts at Different Positions Across the Main Body Part 11a)]

Figures 6A, 6B:
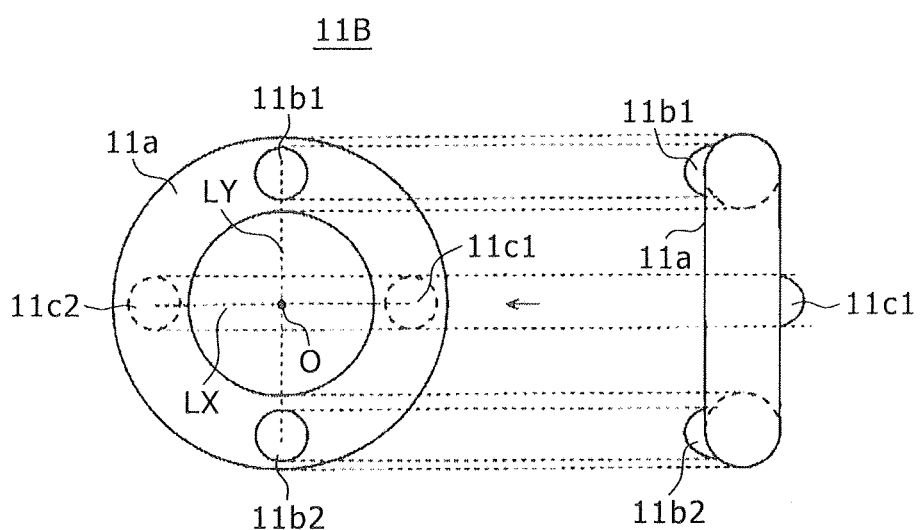
FIGS. 6A and 6B are diagrams for explaining modification example 2 of the ring portion.

FIG. 6 is a diagram for explaining a ring portion 11B (modification example 2 of the ring portion 11). In FIG. 6, FIG. 6A is a top view of the ring portion 11B and FIG. 6B is a side view of the ring portion 11B. In the ring portion 11B shown in FIG. 6, the protrusion parts 11b1 and 11b2 and the protrusion parts 11c1 and 11c2 are provided on the main body part 11a at different positions (positions not corresponding to each other) across this main body part 11a.

Specifically, as is understood from the top view of FIG. 6A, in the ring portion 11B of this modification example 2, the protrusion parts 11b1 and 11b2 shown by solid lines are provided on a straight line LY connecting the centers of the protrusion part 11b1 and the protrusion part 11b2 and of the main body part 11a. The protrusion parts 11c1 and 11c2 shown by dotted lines are provided on a straight line LX intersecting the straight line LY connecting the centers of the protrusion part 11b1 and the protrusion part 11b2 and of the main body part 11a on the opposite side to the protrusion parts 11b1 and 11b2. Furthermore, in the ring portion 11B, the protrusion parts 11b1 and 11b2 and the protrusion parts 11c1 and 11c2 are provided at positions that are point-symmetric about the center O of the ring portion 11B.

Therefore, as is understood from the side view of FIG. 6B, the ring portion 11B has a configuration in which the protrusion parts 11b1 and 11b2 and the protrusion parts 11c1 and 11c2 are provided with the intermediary of the main body part 11a. Consider the case in which the core body 101 of the pen-shaped coordinate indicator 1 using this ring portion 11B is oriented toward the sky direction. In this case, in the state in which the pressing force is not applied to the core body 101, the protrusion parts 11b1 and 11b2 and the protrusion parts 11c1 and 11c2 realize a function to position the main body part 11a to be separated from both the first ferrite 102 and the second ferrite 104.

Although FIG. 6 shows the state in which the straight line LX and the straight line LY are substantially perpendicular to each other, the configuration is not limited thereto. The angle formed by the straight line LX and the straight line LY can be set to various angles. In other words, the protrusion parts 11b1 and 11b2 and the protrusion parts 11c1 and 11c2 can be provided at various positions that do not overlap with each other across the main body part 11a.

[Modification Example 3 of Ring Portion 11 (Three Protrusion Parts at Corresponding Positions Across the Main Body Part 11a)]

Figure 7A:
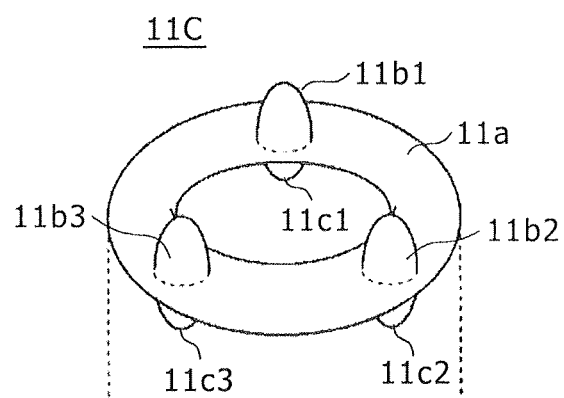
FIGS. 7A to 7C are diagrams for explaining modification example 3 of the ring portion.
Figure 7B:
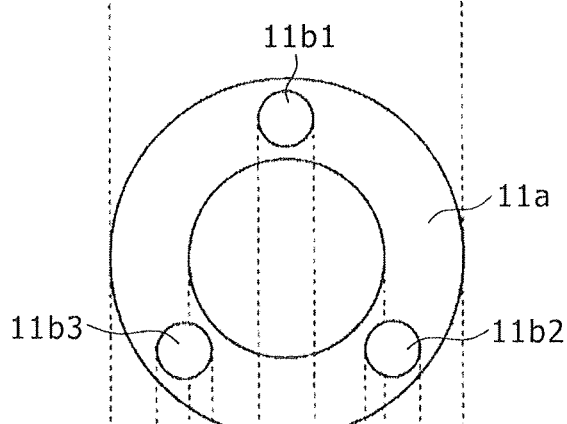
Figure 7C:
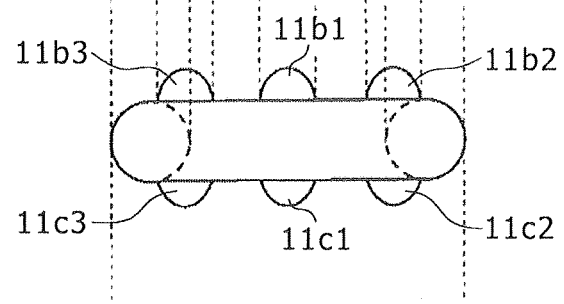

FIG. 7 is a diagram for explaining a ring portion 11C (modification example 3 of the ring portion 11). In FIG. 7, FIG. 7A is a perspective view of the ring portion 11C and FIG. 7B is a top view of the ring portion 11C. FIG. 7C is a side view of the ring portion 11C.

As shown in the top view of FIG. 7B, in the ring portion 11C, three protrusion parts 11b1, 11b2, and 11b3 are provided on the main body part 11a. In this ring portion 11C, the protrusion parts 11b1, 11b2, and 11b3 are provided at such positions that the distances between the respective protrusion parts are almost equal on the main body part 11a for example. Of course, they do not need to be provided at positions at the accurately equal distances.

As shown in the perspective view of FIG. 7A, protrusion parts 11c1, 11c2, and 11c3 are provided on the main body part 11a on the opposite side to the forming positions of the protrusion parts 11b1, 11b2, and 11b3 across the main body part 11a. That is, as shown in the side view of FIG. 7C, the ring portion 11C is composed of the main body part 11a and the protrusion parts 11b1, 11b2, and 11b3 and the protrusion parts 11c1, 11c2, and 11c3 provided at positions on the main body part 11a corresponding to each other across this main body part 11a.

[Modification Example 4 of Ring Portion 11 (Three Protrusion Parts on Single Side)]

Figures 8A, 8B:
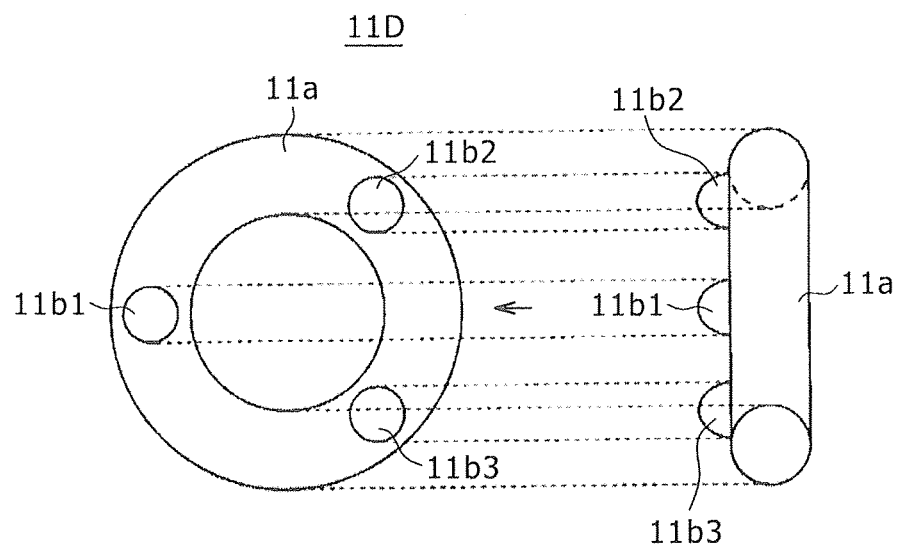
FIGS. 8A and 8B are diagrams for explaining modification example 4 of the ring portion.

FIG. 8 is a diagram for explaining a ring portion 11D (modification example 4 of the ring portion 11). In FIG. 8, FIG. 8A is a top view of the ring portion 11D and FIG. 8B is a side view of the ring portion 11D. In the ring portion 11D, the protrusion parts 11b1, 11b2, and 11b3 are provided only on the side of the main body part 11a opposed to the first ferrite 102 or only on the side of the main body part 11a opposed to the second ferrite 104 as shown in FIGS. 8A and 8B. In this example, the positional relationship on the main body part 11a among three protrusion parts 11b1, 11b2, and 11b3 is the same as that in the ring portion 11C shown in FIG. 7.

[Modification Example 5 of Ring Portion 11 (Three Protrusion Parts at Different Positions Across the Main Body Part 11a)]

Figures 9A, 9B:
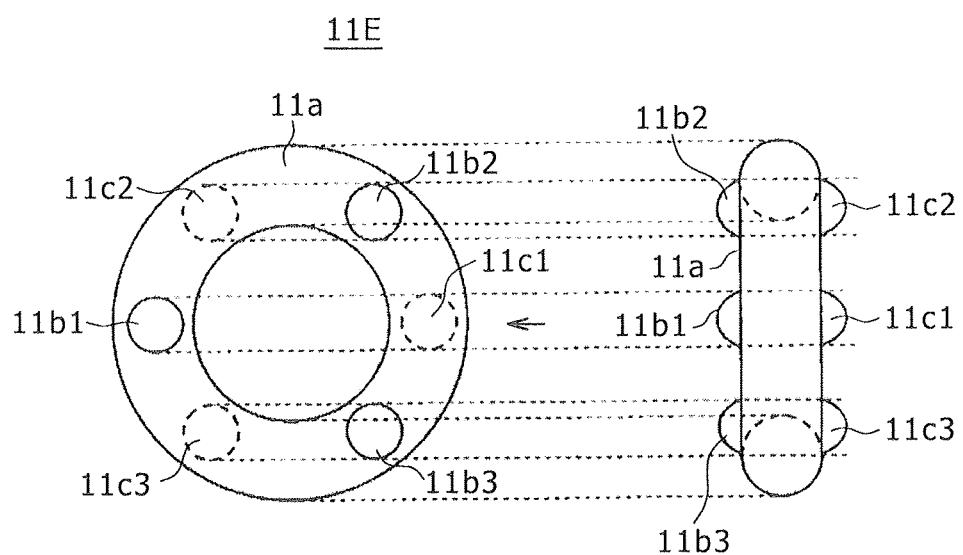
FIGS. 9A and 9B are diagrams for explaining modification example 5 of the ring portion.

FIG. 9 is a diagram for explaining a ring portion 11E (modification example 5 of the ring portion 11). In FIG. 9, FIG. 9A is a top view of the ring portion 11E and FIG. 9B is a side view of the ring portion 11E. In the ring portion 11E, the protrusion parts 11b1, 11b2, and 11b3 and the protrusion parts 11c1, 11c2, and 11c3 are provided on the main body part 11a at different positions (positions not corresponding to each other) across this main body part 11a.

Specifically, on the top view of FIG. 9A, the protrusion parts have such a positional relationship that the protrusion parts 11b1, 11b2, and 11b3 shown by solid lines are each provided between respective two of the protrusion parts 11c1, 11c2, and 11c3 shown by dotted lines. Conversely, the protrusion parts have such a positional relationship that the protrusion parts 11c1, 11c2, and 11c3 shown by the dotted lines are each provided between respective two of the protrusion parts 11b1, 11b2, and 11b3 shown by the solid lines.

[Modification Example 6 of Ring Portion 11 (Four Protrusion Parts at Corresponding Positions Across the Main Body Part 11a)]

Figure 10A:
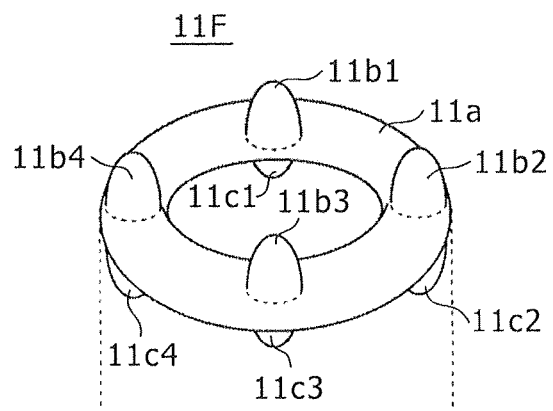
FIGS. 10A to 10C are diagrams for explaining modification example 6 of the ring portion.
Figure 10B:
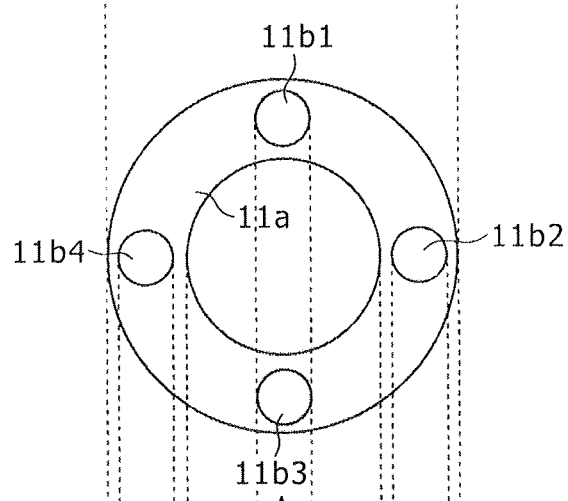
Figure 10C:
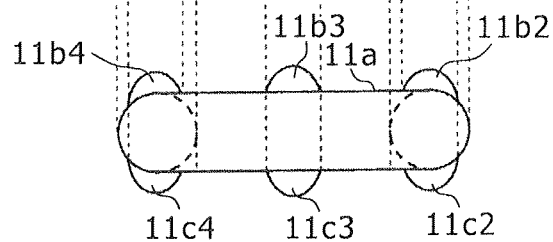

FIG. 10 is a diagram for explaining a ring portion 11F (modification example 6 of the ring portion 11). In FIG. 10, FIG. 10A is a perspective view of the ring portion 11F and FIG. 10B is a top view of the ring portion 11F. FIG. 10C is a side view of the ring portion 11F.

As shown in the top view of FIG. 10B, in the ring portion 11F of this modification example 6, four protrusion parts 11b1, 11b2, 11b3, and 11b4 are provided on the main body part 11a. In this ring portion 11F, the protrusion parts 11b1, 11b2, 11b3, and 114b are provided at such positions that the distances between the respective protrusion parts are almost equal on the main body part 11a. Of course, they do not need to be provided at positions at the accurately equal distances.

As shown in the perspective view of FIG. 10A, protrusion parts 11c1, 11c2, 11c3, and 11c4 are provided on the main body part 11a on the opposite side to the forming positions of the protrusion parts 11b1, 11b2, 11b3, and 11b4 across the main body part 11a. That is, as shown in the side view of FIG. 10C, the ring portion 11F is composed of the main body part 11a and the protrusion parts 11b1, 11b2, 11b3, and 11b4 and the protrusion parts 11c1, 11c2, 11c3, and 11c4 provided at positions on the main body part 11a corresponding to each other across the main body part 11a.

[Modification Example 7 of Ring Portion 11 (Four Protrusion Parts on Single Side)]

Figures 11A, 11B:
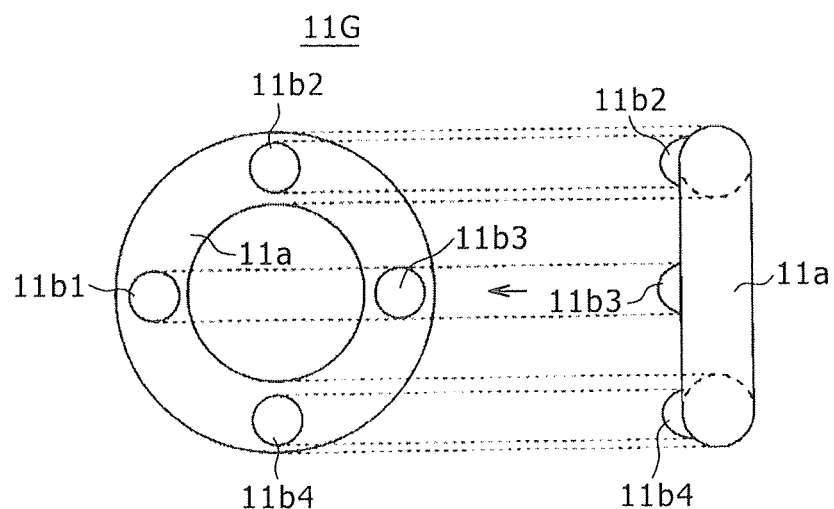
FIGS. 11A and 11B are diagrams for explaining modification example 7 of the ring portion.

FIG. 11 is a diagram for explaining a ring portion 11G (modification example 7 of the ring portion 11). In FIG. 11, FIG. 11A is a top view of the ring portion 11G and FIG. 11B is a side view of the ring portion 11G. In the ring portion 11G, the protrusion parts 11b1, 11b2, 11b3, and 11b4 are provided only on the side of the main body part 11a opposed to the first ferrite 102 or only on the side of the main body part 11a opposed to the second ferrite 104 as shown in FIGS. 11A and 11B. In this example, the positional relationship on the main body part 11a among four protrusion parts 11b1, 11b2, 11b3, and 11b4 is the same as that in the ring portion 11F shown in FIG. 10.

[Modification Example 8 of Ring Portion 11 (Four Protrusion Parts at Different Positions Across the Main Body Part 11a)]

Figures 12A, 12B:
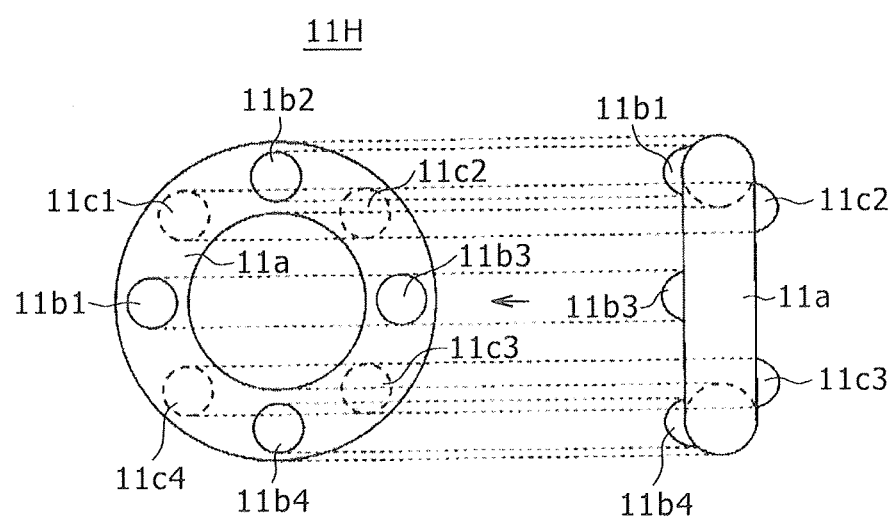
FIGS. 12A and 12B are diagrams for explaining modification example 8 of the ring portion.

FIG. 12 is a diagram for explaining a ring portion 11H (modification example 8 of the ring portion 11). In FIG. 12, FIG. 12A is a top view of the ring portion 11H and FIG. 12B is a side view of the ring portion 11H. In the ring portion 11H, the protrusion parts 11b1, 11b2, 11b3, and 11b4 and the protrusion parts 11c1, 11c2, 11c3, and 11c4 are provided on the main body part 11a at different positions (positions not corresponding to each other) across this main body part 11a.

Specifically, on the top view of FIG. 12A, the protrusion parts 11*b*1, 11*b*2, 11*b*3, and 11*b*4 shown by solid lines are each provided between respective two of the protrusion parts 11*c*1, 11*c*2, 11*c*3, and 11*c*4 shown by dotted lines.

[Modification Example 9 of Ring Portion 11 (Five Protrusion Parts at Corresponding Positions Across the Main Body Part 11*a*)]

Figures 13A, 13B:
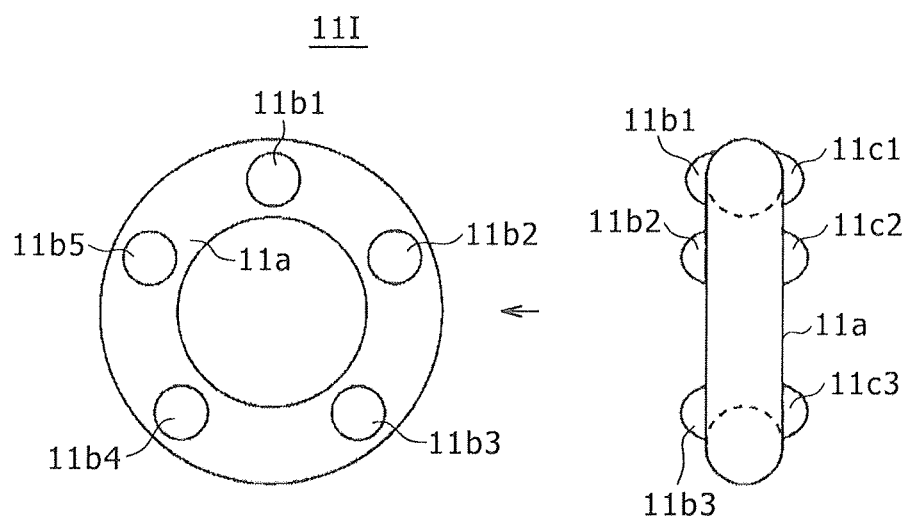
FIGS. 13A and 13B are diagrams for explaining modification example 9 of the ring portion.

FIG. 13 is a diagram for explaining a ring portion 11I (modification example 9 of the ring portion 11). In FIG. 13, FIG. 13A is a top view of the ring portion 11I and FIG. 13B is a side view of the ring portion 11I. In the ring portion 11I, protrusion parts 11*b*1, 11*b*2, 11*b*3, 11*b*4, and 11*b*5 and protrusion parts 11*c*1, 11*c*2, 11*c*3, 11*c*4, and 11*c*5 are provided on the main body part 11*a* at corresponding positions across the main body part 11*a*. In this modification example 9, the protrusion parts 11*b*1 to 11*b*5 and the protrusion parts 11*c*1 to 11*c*5 are provided at such positions that the distances between the respective protrusion parts are almost equal on the main body part 11*a*. Of course, they do not need to be provided at positions at the accurately equal distances.

[Modification Example 10 of Ring Portion 11 (Five Protrusion Parts on Single Side)]

Figures 14A, 14B:
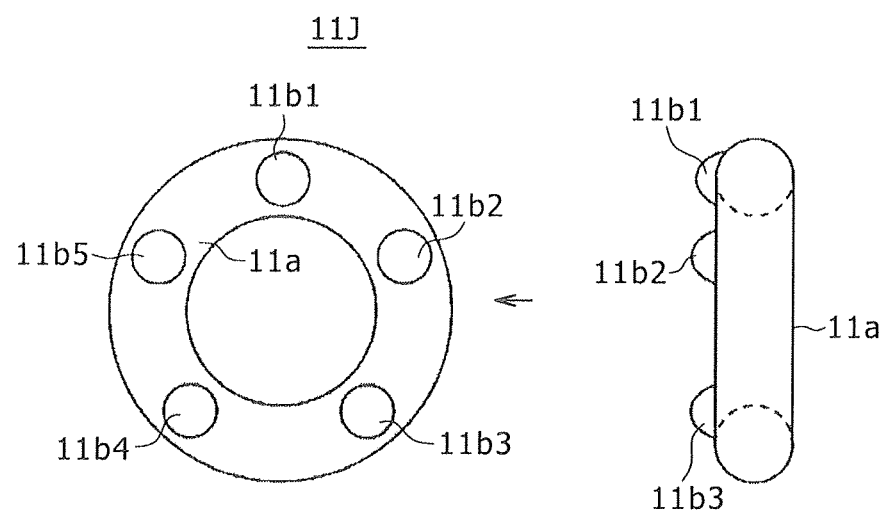
FIGS. 14A and 14B are diagrams for explaining modification example 10 of the ring portion.

FIG. 14 is a diagram for explaining a ring portion 11J (modification example 10 of the ring portion 11). In FIG. 14, FIG. 14A is a top view of the ring portion 11J and FIG. 14B is a side view of the ring portion 11J. In the ring portion 11J, the protrusion parts 11*b*1, 11*b*2, 11*b*3, 11*b*4, and 11*b*5 are provided only on the side of the main body part 11*a* opposed to the first ferrite 102 or only on the side of the main body part 11*a* opposed to the second ferrite 104 as shown in FIGS. 14A and 14B. In this example, the positional relationship on the main body part 11*a* among five protrusion parts 11*b*1 to 11*b*5 is the same as that in the ring portion 11I shown in FIG. 13.

[Modification Example 11 of Ring Portion 11 (Five Protrusion Parts at Different Positions Across the Main Body Part 11*a*)]

FIG. 15 is a diagram for explaining a ring portion 11K (modification example 11 of the ring portion 11). In FIG. 15, FIG. 15A is a top view of the ring portion 11K and FIG. 15B is a side view of the ring portion 11K. In the ring portion 11K, the protrusion parts 11*b*1, 11*b*2, 11*b*3, 11*b*4, and 11*b*5 and the protrusion parts 11*c*1, 11*c*2, 11*c*3, 11*c*4, and 11*c*5 are provided on the main body part 11*a* at different positions (positions not corresponding to each other) across the main body part 11*a*. Specifically, on the top view of FIG. 15A, the protrusion parts 11*b*1, 11*b*2, 11*b*3, 11*b*4, and 11*b*5 shown by solid lines are each provided between respective two of the protrusion parts 11*c*1, 11*c*2, 11*c*3, 11*c*4, and 11*c*5 shown by dotted lines.

[Summarization of Modification Example 1 to Modification Example 11]

In the following, the protrusion parts 11*b*1 to 11*b*5 will be collectively referred to as the protrusion part 11*b* and the protrusion parts 11*c*1 to 11*c*5 will be collectively referred to as the protrusion part 11*c* except for the case of describing each of the protrusion parts separately. As described above, modification examples of the ring portion 11 can be realized by providing the plural protrusion parts 11*b* and 11*c* on the main body part 11*a*.

As is understood from the explanation of the above-described embodiment and modification examples thereof, the ring portion 11 and the ring portions 11A to 11K as modification examples thereof can be classified into three groups. First, the ring portion 11 (FIG. 3), the ring portion 11C (FIG. 7), the ring portion 11F (FIG. 10), and the ring portion 11I (FIG. 13) are based on the same technical idea in that the protrusion parts 11*b* and the protrusion parts 11*c* are provided at corresponding positions on the main body part 11*a* across the main body part 11*a*; they form a first group.

The ring portion 11A (FIG. 5), the ring portion 11D (FIG. 8), the ring portion 11G (FIG. 11), and the ring portion 11J (FIG. 14) are based on the same technical idea in that the protrusion parts 11*b* are provided only on a single side of the main body part 11*a*; they form a second group. The ring portion 11B (FIG. 6), the ring portion 11E (FIG. 9), the ring portion 11H (FIG. 12), and the ring portion 11K (FIG. 15) are based on the same technical idea in that the protrusion parts 11*b* and the protrusion parts 11*c* are provided at different positions on the main body part 11*a* across the main body part 11*a*; they form a third group.

In the ring portion 11A (FIG. 5), the ring portion 11D (FIG. 8), the ring portion 11G (FIG. 11), and the ring portion 11J (FIG. 14), which form the second group, the protrusion parts 14*b* are formed only on a single side of the main body part 11*a* as shown in the respective diagrams. Thus, when they are applied to the pen-shaped coordinate indicator 1, the distance between the opposing end surfaces of the first ferrite 102 and the second ferrite 104 cannot be set longer compared with the ring portion 11 of the first and third groups. However, by adjusting the length and shape of the protrusion parts 11*b* provided on the single side of the main body part 11*a*, almost the same effect as that in the case of using the ring portion 11 of the first and third groups can be achieved in terms of the effect to position the main body part 11*a* to be separated from at least one of the first ferrite 102 and the second ferrite 104.

In the case of using the ring portion 11 of the first and third groups, the gap between the first ferrite 102 and the second ferrite 104 can be made larger and erroneous detection of the pressing force (writing pressure) can be prevented with high accuracy. Furthermore, in the case of using the ring portion 11 of the first and third groups, the feeling of pressing felt by the user at the initial pressing can be made softer due to the configuration in which the protrusion parts 11*b* and the protrusion parts 11*c* are so provided as to sandwich the main body part 11*a*.

The ring portion 11 of the first group and the ring portion 11B of the third group can obtain almost equal characteristics. More feeling of stability between the first ferrite 102 and the second ferrite 104 can be obtained in the ring portion 11B of the third group compared with the ring portion 11 of the first group.

When the number of protrusion parts 11*b* and protrusion parts 11*c* is increased, unevenness between the first ferrite 102 and the second ferrite 104 can be reduced. Furthermore, the phase-load characteristic can be adjusted based on the number of protrusion parts 11*b* and protrusion parts 11*c*.

In the above-described embodiment and modification examples, specific examples of the case in which the numbers of protrusion parts 11*b* and protrusion parts 11*c* are two to five are described. However, the configuration is not limited thereto. It is also possible to provide six or more protrusion parts 11*b* and protrusion parts 11*c* by adjusting the size of the protrusion parts 11*b* and the protrusion parts 11*c*. Furthermore, it is also possible to adjust the phase-load characteristic shown in FIG. 4 by adjusting the height of the protrusion parts 11*b* and the protrusion parts 11*c*.

The positions at which the protrusion parts 11*b* and 11*c* are provided are also not limited to those of the above-described embodiments. The protrusion parts 11*b* and 11*c* may be provided at random positions on the main body part 11*a*. That is, various forms can be employed regarding the positions at which the protrusion parts 11b and 11c are provided. However, it is preferable to provide the protrusion parts 11b and 11c without bias and evenly or uniformly.

[Modification Examples of Shape of Protrusion Parts 11b and 11c]

The protrusion parts 11b and the protrusion parts 11c in the ring portion 11 explained by using FIGS. 2 and 3 and modification examples 1 to 11 thereof have a substantially hemispherical three-dimensional shape whose section has a substantially semicircular shape as explained by using FIGS. 2, 3, 5 to 15. However, the configuration is not limited thereto. The protrusion part 11b and the protrusion part 11c can have various three-dimensional shapes. FIG. 16 is a diagram for explaining other examples of the shape of the protrusion part 11b and the protrusion part 11c.

Specifically, it is also possible for the protrusion parts 11b and 11c to have, besides a hemispherical shape or a substantially hemispherical shape shown in also FIG. 16A, a conical shape shown in FIG. 16B, a quadrangular pyramidal shape shown in FIG. 16C, a triangular pyramidal shape shown in FIG. 16D, and a quadrangular prismatic shape shown in FIG. 16E. Of course, the shape is not limited thereto and a polygonal pyramidal shape and a polygonal prismatic shape can also be employed as the shape of the protrusion parts 11b and 11c.

Also as described above, the size and height of the protrusion part 11b and the protrusion part 11c can also be arbitrarily selected. Actually a pen-shaped coordinate indicator using the ring portion 11, in which the protrusion parts 11b and 11c having various shapes, sizes, and heights are provided, is configured and the load-phase characteristic explained by using FIG. 4 is measured. Then, the ring portion 11 is provided, in which the protrusion parts 11b and 11c having shape, size, and height are formed to yield the intended characteristics.

[Modification Example 12 of Ring Portion 11 (Example in which Cylindrical Ridge Parts are Provided on the Main Body Part 11a)]

Figure 17A:
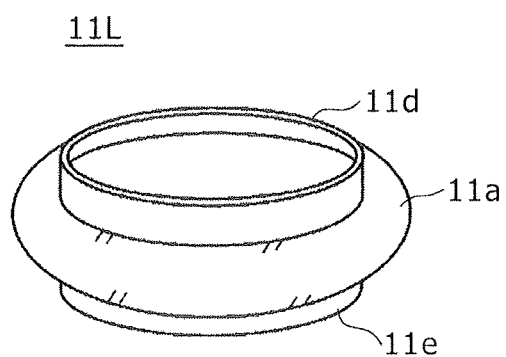
FIGS. 17A to 17C are diagrams for explaining modification example 12 of the ring portion.
Figure 17B:
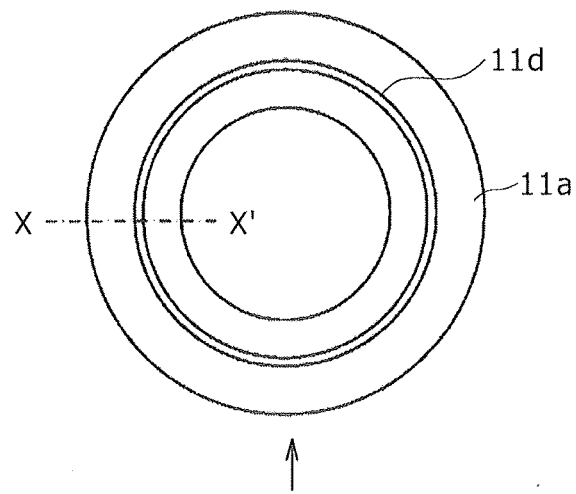
Figure 17C:
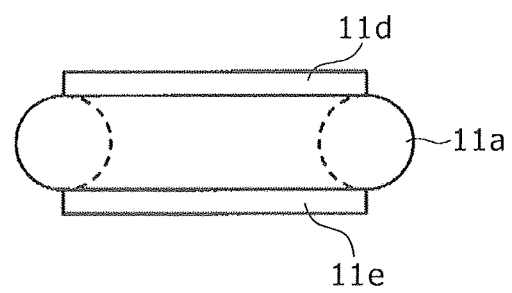

FIG. 17 is a diagram for explaining a ring portion 11L (modification example 12 of the ring portion 11). In FIG. 17, FIG. 17A is a perspective view of the ring portion 11L and FIG. 17B is a top view of the ring portion 11L. FIG. 17C is a side view of the ring portion 11L.

In this ring portion 11L, two or more protrusion parts 11b and protrusion parts 11c having, e.g., a hemispherical three-dimensional shape are not provided differently from the above-described ring portion 11 and the ring portions 11A to 11K. As shown in FIG. 17A, this ring portion 11L has a configuration in which cylindrical ridge parts (projections) 11d and 11e are provided for the main body part 11a.

As shown in FIG. 17B, the cylindrical ridge part 11d is provided at, e.g., the part of the main body part 11a that is opposed to the first ferrite 102 and comes in contact with the first ferrite 102 first if this ridge part 11d does not exist. Similarly, in the case of this example, the cylindrical ridge part 11e is provided at, e.g., the part of the main body part 11a that is opposed to the second ferrite 104 and comes in contact with the second ferrite 104 first if this ridge part 11e does not exist. That is, as shown in FIG. 17C, the ridge parts 11d and 11e are provided at corresponding positions on the main body part 11a across the main body part 11a.

Due to this, in the case of this ring portion 11L, the ridge parts 11d and 11e realize the same function as that of the protrusion part 11b and the protrusion part 11c of the above-described ring portion 11 and ring portions 11A to 11K. This ring portion 11L can also be used in the case of configuring the pen-shaped coordinate indicator 1 having the load-phase characteristic explained in FIG. 4.

[Variations of Ring Portion 11L of Modification Example 12]

Variations of the ring portion 11L of modification example 12 explained by using FIG. 17 will be described below. FIG. 18 is a sectional view when the ring portion 11L is cut at the position shown by dotted line X-X' in FIG. 17B and is a diagram for explaining variations of the shape of the ridge parts 11d and 11e provided for the main body part 11a.

Figure 18A:
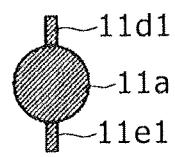
FIGS. 18A to 18F are diagrams for explaining variations of a ring portion of modification example 12.
Figure 18C:
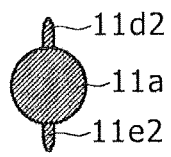
Figure 18E:
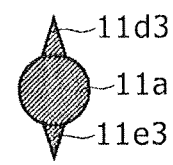
Figure 18B:
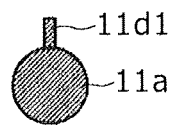
Figure 18D:
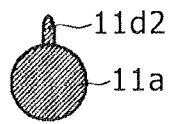
Figure 18F:
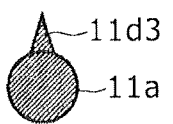

First, it is possible to employ a form in which the ridge part 11d and the ridge part 11e are provided at corresponding positions on the main body part 11a across the main body part 11a as explained by using FIG. 17 and as shown in FIGS. 18A, 18C, and 18E. Furthermore, it is also possible to employ a form in which the ridge part 11d is provided for the main body part 11a only on the side of the main body part 11a opposed to the first ferrite 102 or only on the side of the main body part 11a opposed to the second ferrite 104 as shown in FIGS. 18B, 18D, and 18F. As the sectional shape of the ridge part, shapes such as a rectangular shape (FIGS. 18A and 18B), a semicircular shape (FIGS. 18C and 18D), and a triangular shape (FIGS. 18E and 18F) can be employed.

In the case of the ring portion 11L shown in FIGS. 17 and 18, the positions at which the ridge parts 11d and 11e are provided on the main body part 11a may be any position as long as it is a position opposed to the first ferrite 102 or the second ferrite 104. Various changes can be made also regarding the height and width of the ridge parts 11d and 11e. The ridge parts 11d and 11e are not limited to that having a ring shape shown in FIG. 17. They may have a notch made at a desired position. That is, a configuration in which plural ridge parts are provided on the main body part 11a can also be employed.

[Example of Alternate Member of Ring Portion 11 (Elastic Member)]

In the explanation of the above-described embodiment and modification examples thereof, the elastic body provided between the first ferrite 102 and the second ferrite 104 is not limited to that having a configuration obtained by providing protrusion parts for the ring-shaped main body part 11a.

Figure 19:
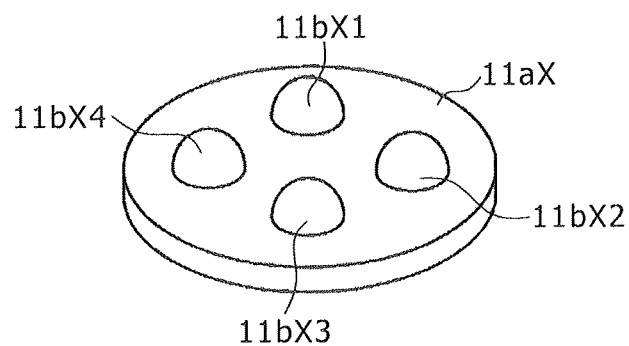
FIG. 19 is a diagram for explaining one example of an alternate member of the ring portion.

FIG. 19 is a diagram for explaining one example of an alternate member 11X of the ring portion 11 and the ring portions 11A to 11L. The alternate member 11X of this example is formed by synthetic resin or synthetic rubber similarly to the above-described ring portion 11. As shown in FIG. 19, the alternate member 11X is obtained by providing four, in the case of this example, protrusion parts 11bX1, 11bX2, 11bX3, and 11bX4 on at least one surface of a base part 11aX formed into a circular flat plate shape. The protrusion parts 11bX1, 11bX2, 11bX3, and 11bX4 are formed into a substantially hemispherical shape as shown in FIG. 19.

In the case of the alternate member 11X shown in FIG. 19, the protrusion parts 11bX1, 11bX2, 11bX3, and 11bX4 realize the same function as that of the protrusion part 11b and the protrusion part 11c of the above-described ring portion 11 and ring portions 11A to 11K. Specifically, consider the case in which the core body 101 of the pen-shaped coordinate indicator 1 including the alternate member 11X is oriented toward the sky direction. In this case, the protrusion parts 11bX1, 11bX2, 11bX3, and 11bX4 realize a function to position the first ferrite 102 and the second ferrite 104 to be separated from each other so that they may be prevented from getting closer to each other beyond (shorter than) a predetermined distance. The protrusion parts 11bX1, 11bX2, 11bX3, and 11bX4 of this case exert only such a slight resistance that is sufficient to prevent the first ferrite 102 from getting closer to the second ferrite 104 beyond (shorter than) the predetermined distance.

When a light pressing force (writing pressure) is applied to the core body 101 of this pen-shaped coordinate indicator 1, first the protrusion parts 11bX1, 11bX2, 11bX3, and 11bX4 are deformed. In this case, the first ferrite 102 rapidly gets closer to the second ferrite 104 until the whole of the base part 11aX of the alternate member 11X starts to be pressed (until the resistance of the base part 11aX becomes dominant).

Thereafter, after the whole of the base part 11aX starts to be pressed, the first ferrite 102 gets closer to the second ferrite 104 according to the state of the deformation of the base part 11aX deformed depending on a comparatively high pressing force (writing pressure) applied to the base part 11aX. Due to this, the inductance of the coil 105 changes depending on the distance between the first ferrite 102 and the second ferrite 104. That is, the detection output depending on the pressing force (writing pressure) applied to the core body 101 is obtained.

In this manner, the same function as that of the above-described ring portion 11 and ring portions 11A to 11K is realized also when this alternate member 11X is used, and the alternate member 11X can be used in the case of configuring the pen-shaped coordinate indicator 1 having the load-phase characteristic explained by using FIG. 4.

The alternate member 11X shown in FIG. 19 is explained as the component obtained by providing four protrusion parts 11bX1, 11bX2, 11bX3, and 11bX4 on one surface of the base part 11aX having a circular flat plate shape. However, it is not limited thereto. It may have a configuration in which protrusion parts are provided on both surfaces of the base part 11aX. The number of protrusion parts can also be set to an arbitrary number equal to or larger than one. However, it is preferable to provide three or more protrusion parts on one or both surfaces of the base part 11aX to stably obtain the change in the inductance of the coil 105. The positions at which the protrusion parts are provided can also be set to various positions.

Similarly to the explanation made with FIG. 16, the shape of the protrusion parts 11bX1, 11bX2, 11bX3, 11bX4 can also be set to, besides a hemispherical shape and a substantially hemispherical shape, a conical shape, a quadrangular pyramidal shape, a triangular pyramidal shape, and a quadrangular prismatic shape. Of course, the shape is not limited thereto and a polygonal pyramidal shape and a polygonal prismatic shape can also be employed as the shape of the protrusion parts 11bX1, 11bX2, 11bX3, and 11bX4. The size and height of the protrusion parts 11bX1, 11bX2, 11bX3, 11bX4 can also be arbitrarily selected.

[Another Configuration Example of Pen-Shaped Coordinate Indicator 1]

Figure 20:
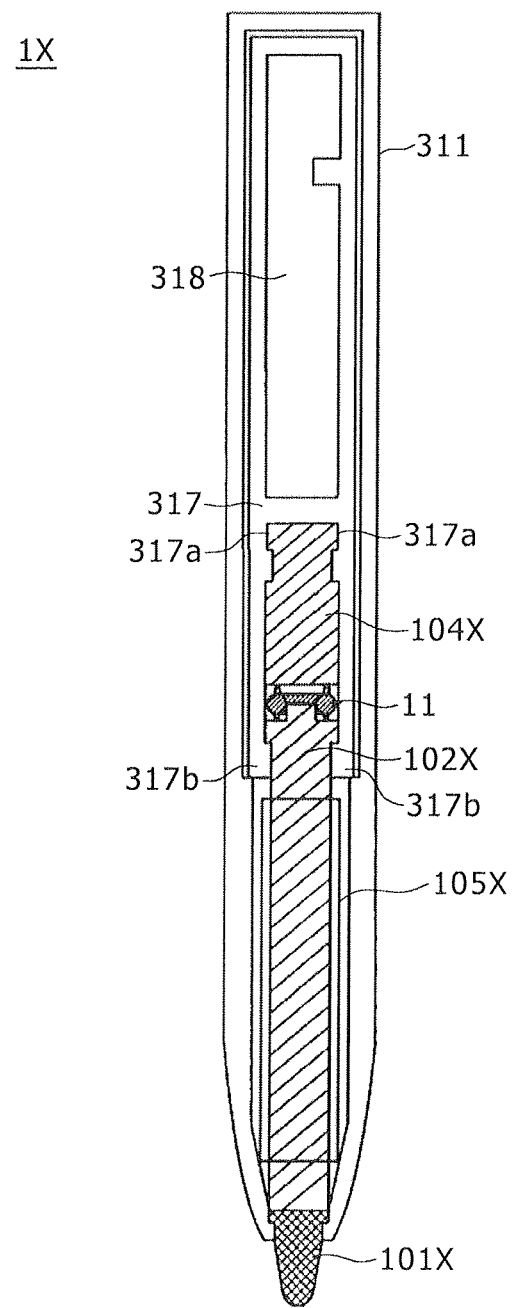
FIG. 20 is a diagram for explaining a pen-shaped coordinate indicator with a different configuration to which this invention can be applied.
Figure 21:
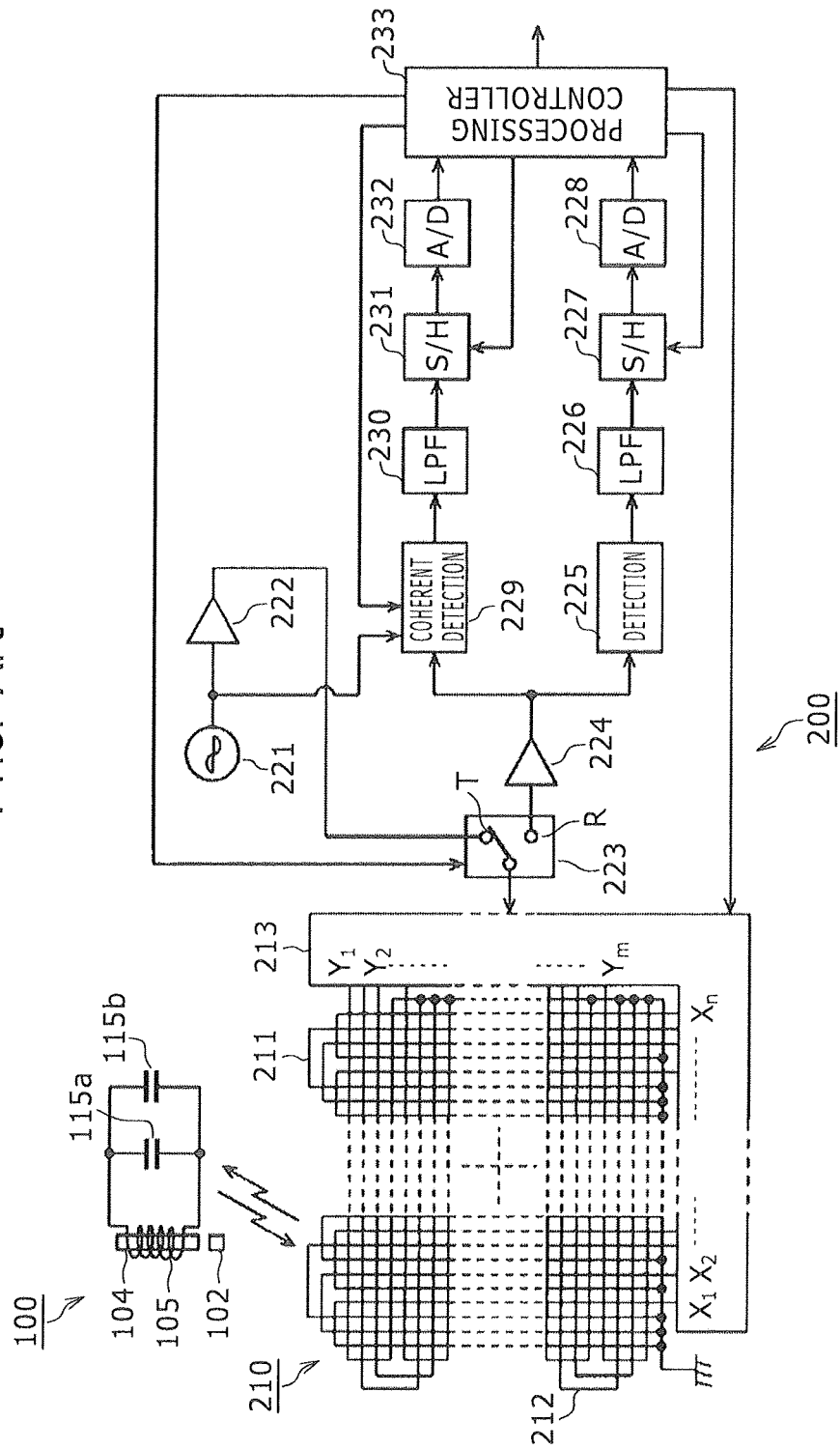
FIG. 21 is a diagram for explaining the related-art pen-shaped coordinate indicator and a position detecting device.

FIG. 20 is a diagram for explaining one example of a pen-shaped coordinate indicator 1X having a different configuration from the pen-shaped coordinate indicator 1 of the above-described embodiment. In FIG. 20, the front-side half of a case 311 and a holder 317 of the pen-shaped coordinate indicator 1X of this example is cut and removed to show the outline of the structure of the inside. The case 311 is a chassis that is made of, e.g., a synthetic resin such as an ABS resin and is formed to imitate conventional writing equipment such as ballpoint pens and mechanical pencils but in a smaller size. The case 311 is hollow so that the respective members to be described below can be housed therein.

Furthermore, the case 311 is so formed that at least one end part thereof is tapered as shown in FIG. 20, and its tip has an opening.

At the tip part of the case 311 that is tapered, a core body 101X forming the pen tip is disposed to project from the opening of the case 311. The proximal end part of the core body 101X located in the case 311 includes a protrusion, as shown in FIG. 20, which is engaged with the opening part of the case 311. This provides a structure in which the core body 101X does not fall off from the case 311.

As shown in FIG. 20, a first ferrite (ferrite core) 102X is so provided that an (first) end surface thereof abuts against the end surface of the base end part of the core body 101X. A coil 105X is finely wound on the side surface of this first ferrite 102X as shown in FIG. 20. The coil 105X is connected to a capacitor (not shown) on a board 318 to be described later to configure a resonant circuit. A second ferrite (ferrite chip) 104X is so provided that an end surface thereof is opposed to the (second) end surface (i.e., the proximal end surface) of the first ferrite 102X on the opposite side from the side opposing the core body 101X.

The proximal end part of the first ferrite 102X includes a protrusion part that projects toward the outside to be engaged with a protrusion part 317b of the holder 317. This restricts the movement of the first ferrite 102X in the case 311 toward the core body 101X. That is, the first ferrite 102X is allowed to slide in the case 311 within a predetermined range along the longitudinal direction of the pen-shaped coordinate indicator 1X.

As shown in FIG. 20, e.g., the above-described ring portion 11, ring portion 11A to 11L, or the alternate member 11X is provided between the first ferrite 102X and the second ferrite 104X. Thus, this invention can be applied also to the pen-shaped coordinate indicator 1X shown in FIG. 20.

[Others]

The first ferrites 102 and 102X and the second ferrites 104 and 104X are not limited to that having a circular columnar shape. One formed into a polygonal columnar shape may be used.

In the above-described embodiment, it is explained that the main body part 11a and the projections 11b, 11c, 11d, and 11e are integrally molded of the same material. However, the configuration is not limited thereto. Various methods can be used as the forming method of the above-described ring portion 11 and the ring portions 11A to 11K. This applies also to the alternate member 11X.

It is also possible to form the main body part 11a and the projections 11b, 11c, 11d, and 11e from different materials. Similarly, also in the alternate member 11X, it is also possible to form the base part 11aX and the protrusion parts 11bX1, 11bX2, . . . from different materials.

The main body part 11a is not limited to that whose section has a shape of the alphabet "O" (circular shape). For example, it may be one whose section has an elliptical shape or a rectangular shape. The size of the main body part 11a can also be adjusted within such a range that it can be included in the pen-shaped coordinate indicator.

The elastic body provided between the opposing end surfaces of the first ferrite 102 and the second ferrite 104 is not limited to that in the above-described embodiment. For example, an elastic body is possible in which the protrusion part or the ridge part is sandwiched between two main body parts (base parts). Specifically, two main body parts (base parts), each being an elastic body formed of synthetic resin or synthetic rubber and having a ring shape or a flat plate shape, are provided on both of the opposing end surfaces of the first ferrite 102 and the second ferrite 104, respectively.

The protrusion part or the ridge part formed of synthetic resin or synthetic rubber is provided between and in contact with the two main body parts (base parts) provided on the respective sides of the opposing end surfaces of the first ferrite 102 and the second ferrite 104. The elastic body formed in this manner can also be used in a pen-shaped coordinate indicator.

The various embodiments described above can be combined to provide further embodiments. Aspects of the embodiments can be modified, if necessary to employ concepts of the various patents, applications and publications to provide yet further embodiments.

DESCRIPTION OF REFERENCE SYMBOLS 1, 1X . . . Pen-shaped coordinate indicator, 11, 11A, 11B, 11C, 11D, 11E, 11F, 11G, 11H, 11I, 11J, 11K, 11L . . . Ring portion, 11a . . . Main body part (O-ring part), 11aX . . . Base part (main body part), 11b, 11b1, 11b2, 11b3, 11b4, 11b5 . . . Protrusion part, 11c, 11c1, 11c2, 11c3, 11c4, 11c5 . . . Protrusion part, 11d, 11d1, 11d2, 11d3 . . . Ridge part, 11e, 11e1, 11e2, 11e3 . . . Ridge part, 11X . . . Alternate member, 11bX1, 11bX2, 11bX3, 11bX4 . . . Protrusion part, 101, 101X . . . Core body, 102, 102X . . . First ferrite, 104, 104X . . . Second ferrite, 105, 105X . . . Coil, 111, 311 . . . Case, 103 . . . O-ring, 317 . . . Holder, 317a . . . Recess, 317b . . . Protrusion part, 318 . . . Board, 2 . . . Electronic apparatus, 2D . . . Display screen, 21 . . . Housing recess, 22 . . . Position detecting device, 100 . . . Pen-shaped coordinate indicator, 200 . . . Position detecting device

The invention claimed is:

1. A pen-shaped coordinate indicator comprising:
a core body that projects from one end of a chassis to form a pen tip;
a columnar first magnetic body having a first end surface and a second end surface, the first end surface being in contact with the core body;
a columnar second magnetic body having a first end surface opposite the second end surface of the first magnetic body;
a coil wound around at least one of the first and second magnetic bodies;
a capacitor connected to the coil; and
an elastic body that is provided between the second end surface of the first magnetic body and the first end surface of the second magnetic body and is configured to be deformed when a pressing force is applied to the core body in an axial direction, wherein
the elastic body is composed of a main body part and at least one projection extending outwardly from an external surface of the main body part, and the main body and the at least one projection are formed of the same material and form a continuous structure,
the at least one projection contacts at least one of the second end surface of the first magnetic body and the first end surface of the second magnetic body;
the main body part and the projection are arranged to position the first magnetic body and the second magnetic body to be separated from each other in a state in which the pressing force is not applied to the core body, and
when the pressing force is applied to the core body, initially the projection is mainly deformed, and after the projection is deformed, the main body part is mainly deformed to thereby change a distance between the first magnetic body and the second magnetic body according to the pressing force applied to the core body.

2. The pen-shaped coordinate indicator according to claim 1, wherein
the projection is provided on at least one of two sides of the main body part, which are opposed to the first magnetic body and the second magnetic body, respectively.

3. The pen-shaped coordinate indicator according to claim 2, wherein
the projection is provided on only one of the two sides of the main body part.

4. The pen-shaped coordinate indicator according to claim 2, wherein
the projection is provided on each of the two sides of the main body part.

5. The pen-shaped coordinate indicator according to claim 1, wherein
the projections are provided to form a pair at positions on each of two sides of the main body part, which are opposed to the first magnetic body and the second magnetic body, respectively.

6. The pen-shaped coordinate indicator according to claim 5, wherein
the positions at which the projections are provided coincide between the two sides across the main body part.

7. The pen-shaped coordinate indicator according to claim 5, wherein
the positions at which the projections are provided are offset between the two sides across the main body part.

8. The pen-shaped coordinate indicator according to claim 1, wherein
the projections are provided at different positions on two sides of the main body part, which are opposed to the first magnetic body and the second magnetic body, respectively.

9. The pen-shaped coordinate indicator according to claim 1, wherein
the projection has any of a hemispherical shape, a conical shape, a pyramidal shape, and a prismatic shape.

10. The pen-shaped coordinate indicator according to claim 1, wherein
the projections are arranged evenly across at least one of two sides of the main body part.

11. The pen-shaped coordinate indicator according to claim 1, wherein
the projection is a ridge part formed on the main body part.

12. The pen-shaped coordinate indicator according to claim 1, wherein
the main body part is formed into a ring shape or a flat plate shape.

13. The pen-shaped coordinate indicator according to claim 1, wherein
the elastic body is formed of synthetic resin or synthetic rubber.

14. The pen-shaped coordinate indicator according to claim 1, wherein
when the pressing force is applied to the core body, initially the projection is mainly deformed until the pressing force reaches a first threshold value and, thereafter, the main body part is mainly deformed until the pressing force reaches a second threshold value, wherein the first and second threshold values define a detection range of the pen-shaped coordinate indicator.

15. The pen-shaped coordinate indicator according to claim 14, wherein
the first threshold value is less than one half of the second threshold value.

16. A method of detecting a pressing force applied to a pen tip of a pen-shaped coordinate indicator, comprising:
providing the pen-shaped coordinate indicator including: a core body that projects from a distal end of a chassis to form a pen tip; a columnar first magnetic body having a distal end surface and a proximal end surface, the distal end surface being in contact with the core body; a columnar second magnetic body having a distal end surface opposed to the proximal end surface of the first magnetic body; a coil wound around at least one of the first and second magnetic bodies; a capacitor connected to the coil; and an elastic body provided between the proximal end surface of the first magnetic body and the distal end surface of the second magnetic body, the elastic body being composed of a main body part and one or more projections extending outwardly from an external surface of the main body part, the main body part and the one or more projections being formed of the same material and forming a continuous structure, and the one or more projections contacting at least one of the proximal end surface of the first magnetic body and the distal end surface of the second magnetic body;

when the pressing force is not applied to the pen tip, having the main body part and the one or more projections position the first magnetic body and the second magnetic body to be separated from each other; and when the pressing force is applied to the pen tip, initially having the one or more projections mainly deformed, and thereafter having the main body part mainly deformed to thereby change a distance between the first magnetic body and the second magnetic body according to the pressing force applied to the pen tip.

17. The method according to claim 16, wherein the main body part and the one or more projections position the first magnetic body and the second magnetic body to be separated from each other when the pressing force is not applied to the pen tip even when the pen tip is pointed upwardly.

18. The method according to claim 16, wherein when the pressing force is applied, initially having the one or more projections mainly deformed until the pressing force reaches a first threshold value and, thereafter, having the main body part mainly deformed until the pressing force reaches a second threshold value, wherein the first and second threshold values define a detection range of the pen-shaped coordinate indicator.

* * * * *